(12) United States Patent
Sarwer et al.

(10) Patent No.: US 12,294,715 B2
(45) Date of Patent: May 6, 2025

(54) LOSSLESS CODING OF VIDEO DATA

(71) Applicant: ALIBABA GROUP HOLDING LIMITED, Grand Cayman (KY)

(72) Inventors: Mohammed Golam Sarwer, San Mateo (CA); Jiancong Luo, San Mateo, CA (US); Yan Ye, San Mateo, CA (US)

(*) Notice: Subject to any disclaimer, the term of this patent is extended or adjusted under 35 U.S.C. 154(b) by 0 days.

(21) Appl. No.: 18/738,130

(22) Filed: Jun. 10, 2024

(65) Prior Publication Data

US 2024/0357119 A1 Oct. 24, 2024

Related U.S. Application Data

(63) Continuation of application No. 17/000,899, filed on Aug. 24, 2020, now Pat. No. 12,047,578.

(60) Provisional application No. 62/904,574, filed on Sep. 23, 2019.

(51) Int. Cl.
| | |
|---|---|
| *H04N 7/12* | (2006.01) |
| *H04N 19/12* | (2014.01) |
| *H04N 19/124* | (2014.01) |
| *H04N 19/132* | (2014.01) |
| *H04N 19/176* | (2014.01) |
| *H04N 19/189* | (2014.01) |
| *H04N 19/46* | (2014.01) |
| *H04N 19/61* | (2014.01) |

(52) U.S. Cl.
CPC ........... *H04N 19/132* (2014.11); *H04N 19/12* (2014.11); *H04N 19/124* (2014.11); *H04N 19/176* (2014.11); *H04N 19/189* (2014.11); *H04N 19/46* (2014.11); *H04N 19/61* (2014.11)

(58) Field of Classification Search
CPC ............................ H04N 19/12; H04N 19/189
See application file for complete search history.

(56) References Cited

U.S. PATENT DOCUMENTS

| | | |
|---|---|---|
| 2013/0287103 A1 | 10/2013 | Seregin et al. |
| 2014/0016698 A1 | 1/2014 | Joshi et al. |
| 2014/0169452 A1 | 6/2014 | Lim et al. |
| 2015/0195574 A1 | 7/2015 | Yu et al. |
| 2016/0029030 A1 | 1/2016 | Mrak et al. |

FOREIGN PATENT DOCUMENTS

| | | |
|---|---|---|
| CN | 1917647 A | 2/2007 |
| CN | 102137263 A | 7/2011 |
| CN | 104782125 A | 7/2015 |

(Continued)

OTHER PUBLICATIONS

First Office Action issued in corresponding Chinese Application No. 202312260270377.0 on Dec. 26, 2023 (42 pages).

(Continued)

*Primary Examiner* — Y Lee
(74) *Attorney, Agent, or Firm* — Finnegan, Henderson, Farabow, Garrett & Dunner, LLP

(57) ABSTRACT

The present disclosure provides systems and methods for performing residual coding of video data. According to certain disclosed embodiments, the methods include: receiving control information for coding a video sequence; and determining, based on the control information, a coding method for coding a prediction residual signal of a coding block in the video sequence. The coding method is one of a transform residual coding and a transform-skip residual coding.

6 Claims, 16 Drawing Sheets

(56) References Cited

FOREIGN PATENT DOCUMENTS

| | | | |
|---|---|---|---|
| CN | 105264891 A | 1/2016 |
| CN | 105493507 A | 4/2016 |
| CN | 105556963 A | 5/2016 |
| KR | 20140081681 A | 7/2014 |
| WO | 2020254335 A1 | 12/2020 |
| WO | 2021052348 A9 | 4/2021 |

OTHER PUBLICATIONS

Abdoli et al., "CE8: BDPCM with horizontal/vertical predictor and independently decodable areas (test 8.3.1b)," JVET-M0057, 13th Meeting: Marrackech, MA Jan. 9-18, 2019, 7 pages.

Clare et al., "CE8-4.1: BDPCM and Transform skip for Chroma," JVET-P0059-v1, 16th Meeting: Geneva, CH, Oct. 1-11, 2019, 6 pages.

Karczewicz et al., "CE8-related: Quantized residual BDPCM," JVET-N0413, 14th Meeting: Geneva, CH, Mar. 19-27, 2019, 6 pages.

Ma et al., "Lossless coding for VVC," JVET-O1061, 15th Meeting: Gothenburg, SE, Jul. 3-12, 2019, 19 pages.

Extended European Search Report, issued by European Patent Office in corresponding with a European Application No. 20868316.9, mailed Sep. 8, 2023 (17 pages).

Bross, et al., "Versatile Video Coding (Draft 8)", 17th JVET Meeting; Jan. 7-17, 2020, Brussels; (The Joint Video Exploration Team of ISO/IEC JTC1/SC29/WG11 and ITU-T SG. 16 ), No. JVET-O2001-vE; JVET-O2001 Mar. 12, 2020, (pp. 1-510) Retrieved from the Internet: URL:http://phenix.int-evry.fr/jveUdoc_end_user/documents/17 Brussels/wg11/JVETQ2001- v15.zip JVET-O2001-vE.docx [retrieved on Mar. 12, 2020].

Ma et al., "Lossless coding for VVC", 15th JVET Meeting; Jul. 3-12, 2019, Gothenburg; (The Joint Video Exploration Team of ISO/IEC JTC1/SC29/WG11 and ITU-T SG. 16 ), No. JVET-O1061, Jul. 8, 2019, XP030220701 (17 pages) Retrieved from the Internet: URL:http://phenix.intvry.fr/jveUdoc_end_user/documents/15_Gothenburg/wg 11/JVET-O1061-v2.zip JVETO1061 r1 .docx [retrieved on Jul. 8, 2019].

Chen et al., "AHG17: Control of transform skip residual coding", 127th MPEG Meeting; Jul. 8-12, 2019; Gothenburg; (Motion Picture Expert Group or ISO/IEC JTC1/SC29/WG11 ), No. m48986 Jul. 3, 2019 (Jul. 3, 2019), XP030207050, Retrieved from the Internet: URL:http://phenix.int-evry.fr/mpeg/doc_end_user/documents/127 Gothenburg/wg 11 /m48986-JVET-O0783-v2-JVET-O0783-v2.zip JVET-O0783-v1 .docx [retrieved on Jul. 3, 2019].

Sarwer et al., "AHG18: Residual coding method for lossless mode", 16th JVET Meeting, Oct. 1-11, 2019, Geneva, (The Joint Video Exploration Team of ISO/IEC JTC1/SC29/WG11 and ITU-T SG.16), No. JVET-P0463, Sep. 24, 2019 (7 pages) Retrieved from the Internet: URL:http://phenix.int-evry.fr/jveUdoc_ end_user/documents/16_Geneva/wgll/JVET-P0463-vl.zip JVET-P0463.docx [retrieved on Sep. 24, 2019].

Lin et al., "AHG18: BDPCM in lossless coding", 128th MPEG Meeting; Oct. 7-11, 2019, Geneva; (Motion Picture Expert Group or ISO/IEC JTC1/SC29/WG11), No. m50106, Sep. 24, 2019, Retrieved from the Internet: URL:http://phenix.int-evry.fr/mpeg/doc_end_user/documents/128_Geneva/wgll/m50106-JVET-P0147-vl-JVET-P014?-vi.zip JVET-P014 7-vl.docx [retrieved on Sep. 24, 2019].

International Search Report and written opinion in related International Application No. PCT/US20/47602, mailed Nov. 20, 2020 (9 pgs.).

International Telecommunications Union "Series H: Audiovisual and Multimedia Systems Infrastructure of audiovisual services—Coding of moving video", ITU-T Telecommunication Standardization Sector of ITU, Apr. 2013, 317 pages.

Sullivan et al., "Overview of the High Efficiency Video Coding (HEVC) Standard," IEEE Transactions on Circuits and Systems for Video Technology, vol. 22, No. 12, pp. 1649-1668, Dec. 2012.

Chen et al. "Algorithm description of Joint Exploration Test Model 7 (JEM7)", Joint Video Exploration Team (JVET), JVET-G1001, 7th Meeting: Torino, IT, Jul. 13-21, 2017, 48 pages.

Segall, "Joint Call for Proposals on Video Compression with Capability beyond HEVC," Joint Video Experts Team (JVET), JVET-H1002, 8th Meeting: Macao, CN, Oct. 18-24, 2017, 27 pages.

Bross et al. "Versatile Video Coding (draft 4)", Joint Video Experts Team (JVET), JVET-M1001, 13th Meeting: Marrakech, MA, Jan. 9-18, 2019, 300 pages.

Bross et al. "Versatile Video Coding (draft 5)", Joint Video Experts Team (JVET), JVET-N1001, 14th Meeting: Geneva, CH, Mar. 19-27, 2019, 406 pages.

Chen et al. "Algorithm description for Versatile Video Coding and Test Model 4 (VTM 4)," Joint Video Experts Team (JVET), 13th Meeting: Marrakech, MA, Jan. 9-18, 2019, JVET-M1002, Jan. 2019, 60 pages.

Lu et al. "CE12: Mapping functions (test CE12-1 and CE12-2)," JVET-M0427, 13th Meeting: Marrakech, MA, Jan. 9-18, 2019, 10 pages.

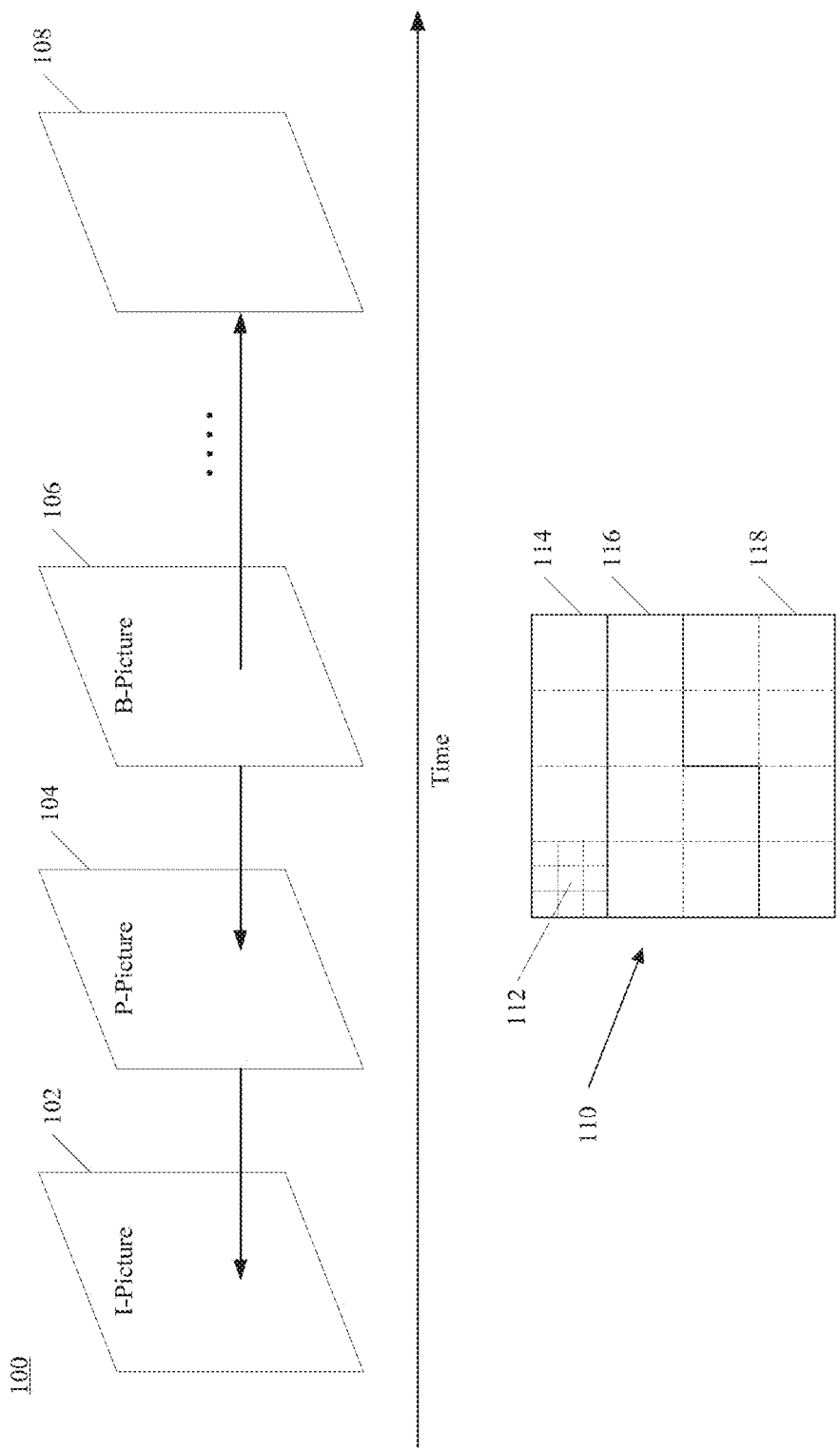

Table 1: Exemplary transform unit syntax

| |  |
|---|---|
| if( tu_cbf_luma[ x0 ][ y0 ] ) { | |
|   if( !transform_skip_flag[ x0 ][ y0 ]! \| cu_transquant_bypass_flag)! | |
|     residual_coding( x0, y0, Log2( tbWidth ), Log2( tbHeight ), 0 ) | |
|   else | |
|     residual_ts_coding( x0, y0, Log2( tbWidth ), Log2( tbHeight ), 0 ) | |
| } | |
| if( tu_cbf_cb[ x0 ][ y0 ] ) | |
|   residual_coding( xC, yC, Log2( wC ), Log2( hC ), 1 ) | |
| if( tu_cbf_cr[ x0 ][ y0 ] &&<br>  !( tu_cbf_cb[ x0 ][ y0 ] && tu_joint_cbcr_residual_flag[ x0 ][ y0 ] )) { | |
|   residual_coding( xC, yC, Log2( wC ), Log2( hC ), 2 ) | |
| } | |

FIG. 5

Table 2: Exemplary SPS syntax for using sps_bdpcm_transform_residual_coding_flag

| | |
|---|---|
| sps_transform_skip_enabled_flag | u(1) |
| if( sps_transform_skip_enabled_flag ) | |
| sps_bdpcm_enabled_flag | u(1) |
| if(sps_bdpcm_enabled_flag && transquant_bypass_enabled_flag) | |
| sps_bdpcm_transform_residual_coding_flag | u(1) |
| sps_joint_cbcr_enabled_flag | u(1) |
| sps_ref_wraparound_enabled_flag | u(1) |

FIG. 6

Table 3: Exemplary Slice Header Syntax

| | |
|---|---|
| if ( !pps_dep_quant_enabled_flag ) | |
| dep_quant_enabled_flag | u(1) |
| if( !dep_quant_enabled_flag ) | |
| sign_data_hiding_enabled_flag | u(1) |
| if( sps_transform_skip_enabled_flag) | |
| slice_ts_residual_coding_disabled_flag | u(1) |
| if( deblocking_filter_override_enabled_flag ) | |
| deblocking_filter_override_flag | u(1) |

FIG. 7

Table 4: Exemplary Transform Block Syntax

| |  |
|---|---|
| if( tu_cbf_luma[ x0 ][ y0 ] ) { | |
| if( !transform_skip_flag[ x0 ][ y0 ] \| \| slice_ts_residual_coding_disabled_flag) | |
| residual_coding( x0, y0, Log2( tbWidth ), Log2( tbHeight ), 0 ) | |
| else | |
| residual_ts_coding( x0, y0, Log2( tbWidth ), Log2( tbHeight ), 0 ) | |
| } | |
| if( tu_cbf_cb[ x0 ][ y0 ] ) | |
| residual_coding( xC, yC, Log2( wC ), Log2( hC ), 1 ) | |
| if( tu_cbf_cr[ x0 ][ y0 ] && <br> !( tu_cbf_cb[ x0 ][ y0 ] && tu_joint_cbcr_residual_flag[ x0 ][ y0 ] )) { | |
| residual_coding( xC, yC, Log2( wC ), Log2( hC ), 2 ) | |
| } | |

FIG. 8

Table 5: Exemplary transform residual coding syntax

| residual_coding( x0, y0, log2TbWidth, log2TbHeight, cIdx ) { | Descriptor |
|---|---|
|   if( ( tu_mts_idx[ x0 ][ y0 ] > 0 \|\| <br>    ( cu_sbt_flag && log2TbWidth < 6 && log2TbHeight < 6 ) ) <br>    && cIdx == 0 && log2TbWidth > 4 ) | |
|     log2ZoTbWidth = 4 | |
|   else | |
|     log2ZoTbWidth = Min( log2TbWidth, 5 ) | |
|   MaxCcbs = 2 * ( 1 << log2TbWidth ) * ( 1<< log2TbHeight ) | |
|   if( tu_mts_idx[ x0 ][ y0 ] > 0 \|\| <br>    ( cu_sbt_flag && log2TbWidth < 6 && log2TbHeight < 6 ) ) <br>    && cIdx == 0 && log2TbHeight > 4 ) | |
|     log2ZoTbHeight = 4 | |
|   else | |
|     log2ZoTbHeight = Min( log2TbHeight, 5 ) | |
|   if (cu_transquant_bypass_flag){ | |
|     LastSignificantCoeffX = (1 << log2TbWidth) - 1 | |
|     LastSignificantCoeffY = (1 << log2TbHeight) - 1 | |
|   } | |
|   else { | |
|     if( log2TbWidth > 0 ) | |
|       last_sig_coeff_x_prefix | ae(v) |
|     if( log2TbHeight > 0 ) | |
|       last_sig_coeff_y_prefix | ae(v) |
|     if( last_sig_coeff_x_prefix > 3 ) | |
|       last_sig_coeff_x_suffix | ae(v) |
|     if( last_sig_coeff_y_prefix > 3 ) | |
|       last_sig_coeff_y_suffix | ae(v) |
|   } | |
|   log2TbWidth = log2ZoTbWidth | |
|   log2TbHeight = log2ZoTbHeight | |
|   remBinsPass1 = ( ( 1 << ( log2TbWidth + log2TbHeight ) ) * 7 ) >> 2 | |
|   log2SbW = ( Min( log2TbWidth, log2TbHeight ) < 2 ? 1 : 2 ) | |
|   log2SbH = log2SbW | |
|   if( log2TbWidth + log2TbHeight > 3 ) { | |
|     if( log2TbWidth < 2 ) { | |
|       log2SbW = log2TbWidth | |
|       log2SbH = 4 – log2SbW | |

FIG. 9

Table 5: Exemplary transform residual coding syntax (continued)

| |  |
|---|---|
| } else if( log2TbHeight < 2 ) { | |
|     log2SbH = log2TbHeight | |
|     log2SbW = 4 − log2SbH | |
|     } | |
| } | |
| numSbCoeff = 1 << ( log2SbW + log2SbH ) | |
| lastScanPos = numSbCoeff | |
| lastSubBlock = ( 1 << ( log2TbWidth + log2TbHeight − ( log2SbW + log2SbH ) ) ) − 1 | |
| do { | |
|     if( lastScanPos = = 0 ) { | |
|         lastScanPos = numSbCoeff | |
|         lastSubBlock− − | |
|     } | |
|     lastScanPos− − | |
|     xS = DiagScanOrder[ log2TbWidth − log2SbW ][ log2TbHeight − log2SbH ]<br>        [ lastSubBlock ][ 0 ] | |
|     yS = DiagScanOrder[ log2TbWidth − log2SbW ][ log2TbHeight − log2SbH ]<br>        [ lastSubBlock ][ 1 ] | |
|     xC = ( xS << log2SbW ) + DiagScanOrder[ log2SbW ][ log2SbH ][ lastScanPos ][ 0 ] | |
|     yC = ( yS << log2SbH ) + DiagScanOrder[ log2SbW ][ log2SbH ][ lastScanPos ][ 1 ] | |
| } while( ( xC != LastSignificantCoeffX ) || ( yC != LastSignificantCoeffY ) ) | |
| if( lastSubBlock = = 0 && log2TbWidth >= 2 && log2TbHeight >= 2 &&<br>    !transform_skip_flag[ x0 ][ y0 ] && lastScanPos > 0 ) | |
|     LfnstDcOnly = 0 | |
| if( ( lastSubBlock > 0 && log2TbWidth >= 2 && log2TbHeight >= 2 ) ||<br>    ( lastScanPos > 7 && ( log2TbWidth = = 2 || log2TbWidth = = 3 ) &&<br>    log2TbWidth = = log2TbHeight ) ) | |
|     LfnstZeroOutSigCoeffFlag = 0 | |
| QState = 0 | |
| inferSbCbf = 1 | |
| for( i = lastSubBlock; i >= 0; i− − ) { | |
|     startQStateSb = QState | |
|     xS = DiagScanOrder[ log2TbWidth − log2SbW ][ log2TbHeight − log2SbH ]<br>        [ i ][ 0 ] | |
|     yS = DiagScanOrder[ log2TbWidth − log2SbW ][ log2TbHeight − log2SbH ]<br>        [ i ][ 1 ] | |
|     inferSbDcSigCoeffFlag = 0 (!cu_transquant_bypass_flag) | |
|     signalcbf = cu_transquant_bypass_flag ? (i > 0 || !inferSbCbf) : ( i < lastSubBlock ) && ( i > 0 ) | |
|     if( ( i < lastSubBlock ) && ( i > 0 ) signalcbf ){ | |

FIG. 9 (continued)

Table 5: Exemplary transform residual coding syntax (continued)

| | |
|---|---|
| coded_sub_block_flag[ xS ][ yS ] | ae(v) |
|     inferSbDcSigCoeffFlag = 1 | |
| } | |
| if( coded_sub_block_flag[ xS ][ yS ] ) | |
|     inferSbCbf = 0 | |
| firstSigScanPosSb = numSbCoeff | |
| lastSigScanPosSb = −1 | |
| firstPosMode0 = ( i = = lastSubBlock ? lastScanPos : numSbCoeff − 1 ) | |
| firstPosMode1 = −1 | |
| for( n = firstPosMode0; n >= 0 && remBinsPass1 >= 4; n− − ) { | |
|     xC = ( xS << log2SbW ) + DiagScanOrder[ log2SbW ][ log2SbH ][ n ][ 0 ] | |
|     yC = ( yS << log2SbH ) + DiagScanOrder[ log2SbW ][ log2SbH ][ n ][ 1 ] | |
|     if( coded_sub_block_flag[ xS ][ yS ] && ( n > 0 \|\| !inferSbDcSigCoeffFlag ) && <br>        ( xC != LastSignificantCoeffX \|\| yC != Last SignificantCoeffY ) <br>        !cu_transquant_bypass_flag)) { | |
|         sig_coeff_flag[ xC ][ yC ] | ae(v) |
|         remBinsPass1− − | |
|         if( sig_coeff_flag[ xC ][ yC ] ) | |
|             inferSbDcSigCoeffFlag = 0 | |
|     } | |
|     if( sig_coeff_flag[ xC ][ yC ] ) { | |
|         abs_level_gtx_flag[ n ][ 0 ] | ae(v) |
|         remBinsPass1− − | |
|         if( abs_level_gtx_flag[ n ][ 0 ] ) { | |
|             par_level_flag[ n ] | ae(v) |
|             remBinsPass1− − | |
|             abs_level_gtx_flag[ n ][ 1 ] | ae(v) |
|             remBinsPass1− − | |
|         } | |
|         if( lastSigScanPosSb = = −1 ) | |
|             lastSigScanPosSb = n | |
|         firstSigScanPosSb = n | |
|     } | |
|     AbsLevelPass1[ xC ][ yC ] = sig_coeff_flag[ xC ][ yC ] + par_level_flag[ n ] + <br>        abs_level_gtx_flag[ n ][ 0 ] + 2 * abs_level_gtx_flag[ n ][ 1 ] | |
|     if( dep_quant_enabled_flag ) | |
|         QState = QStateTransTable[ QState ][ AbsLevelPass1[ xC ][ yC ] & 1 ] | |
|     if( remBinsPass1 < 4 ) | |
|         firstPosMode1 = n − 1 | |

FIG. 9 (continued)

Table 5: Exemplary transform residual coding syntax (continued)

| | |
|---|---|
| } | |
| for( n = numSbCoeff − 1; n >= firstPosMode1; n− − ) { | |
| xC = ( xS << log2SbW ) + DiagScanOrder[ log2SbW ][ log2SbH ][ n ][ 0 ] | |
| yC = ( yS << log2SbH ) + DiagScanOrder[ log2SbW ][ log2SbH ][ n ][ 1 ] | |
| if( abs_level_gtx_flag[ n ][ 1 ] ) | |
| abs_remainder[ n ] | ae(v) |
| AbsLevel[ xC ][ yC ] = AbsLevelPass1[ xC ][ yC ] +2 * abs_remainder[ n ] | |
| } | |
| for( n = firstPosMode1; n >= 0; n− − ) { | |
| xC = ( xS << log2SbW ) + DiagScanOrder[ log2SbW ][ log2SbH ][ n ][ 0 ] | |
| yC = ( yS << log2SbH ) + DiagScanOrder[ log2SbW ][ log2SbH ][ n ][ 1 ] | |
| dec_abs_level[ n ] | ae(v) |
| if(AbsLevel[ xC ][ yC ] > 0 ) | |
| firstSigScanPosSb = n | |
| if( dep_quant_enabled_flag ) | |
| QState = QStateTransTable[ QState ][ AbsLevel[ xC ][ yC ] & 1 ] | |
| } | |
| if( dep_quant_enabled_flag \|\| !sign_data_hiding_enabled_flag ) | |
| signHidden = 0 | |
| else | |
| signHidden = ( lastSigScanPosSb − firstSigScanPosSb > 3 ? 1 : 0 ) | |
| for( n = numSbCoeff − 1; n >= 0; n− − ) { | |
| xC = ( xS << log2SbW ) + DiagScanOrder[ log2SbW ][ log2SbH ][ n ][ 0 ] | |
| yC = ( yS << log2SbH ) + DiagScanOrder[ log2SbW ][ log2SbH ][ n ][ 1 ] | |
| if( ( AbsLevel[ xC ][ yC ] > 0 ) && <br> ( !signHidden \|\| ( n != firstSigScanPosSb ) ) ) | |
| coeff_sign_flag[ n ] | ae(v) |
| } | |
| if( dep_quant_enabled_flag ) { | |
| QState = startQStateSb | |
| for( n = numSbCoeff − 1; n >= 0; n− − ) { | |
| xC = ( xS << log2SbW ) + DiagScanOrder[ log2SbW ][ log2SbH ][ n ][ 0 ] | |
| yC = ( yS << log2SbH ) + DiagScanOrder[ log2SbW ][ log2SbH ][ n ][ 1 ] | |
| if( AbsLevel[ xC ][ yC ] > 0 ) | |
| TransCoeffLevel[ x0 ][ y0 ][ cIdx ][ xC ][ yC ] = <br> ( 2 * AbsLevel[ xC ][ yC ] − ( QState > 1 ? 1 : 0 ) ) * <br> ( 1 − 2 * coeff_sign_flag[ n ] ) | |
| QState = QStateTransTable[ QState ][ par_level_flag[ n ] ] | |
| } else { | |

FIG. 9 (continued)

Table 5: Exemplary transform residual coding syntax (continued)

| | |
|---|---|
| sumAbsLevel = 0 | |
| for( n = numSbCoeff − 1; n >= 0; n− − ) { | |
| xC = ( xS << log2SbW ) + DiagScanOrder[ log2SbW ][ log2SbH ][ n ][ 0 ] | |
| yC = ( yS << log2SbH ) + DiagScanOrder[ log2SbW ][ log2SbH ][ n ][ 1 ] | |
| if( AbsLevel[ xC ][ yC ] > 0 ) { | |
| TransCoeffLevel[ x0 ][ y0 ][ cIdx ][ xC ][ yC ] = <br>    AbsLevel[ xC ][ yC ] * ( 1 − 2 * coeff_sign_flag[ n ] ) | |
| if( signHidden ) { | |
| sumAbsLevel += AbsLevel[ xC ][ yC ] | |
| if( ( n == firstSigScanPosSb ) && ( sumAbsLevel % 2 ) == 1 ) ) | |
| TransCoeffLevel[ x0 ][ y0 ][ cIdx ][ xC ][ yC ] = <br>    −TransCoeffLevel[ x0 ][ y0 ][ cIdx ][ xC ][ yC ] | |
| } | |
| } | |
| } | |
| } | |
| } | |
| } | |

FIG. 9 (continued)

LOSSLESS CODING OF VIDEO DATA

CROSS REFERENCE TO RELATED APPLICATIONS

This application is a continuation of application Ser. No. 17/000,899, filed Aug. 24, 2020, which is based on and claims priority to U.S. Provisional Application No. 62/904,574, filed Sep. 23, 2019, both of which are incorporated herein by reference in their entireties.

TECHNICAL FIELD

The present disclosure generally relates to video processing, and more particularly, to methods and apparatuses for performing lossless coding of video data and selecting a residual coding technique for the lossless coding.

BACKGROUND

A video is a set of static pictures (or "frames") capturing the visual information. To reduce the storage memory and the transmission bandwidth, a video can be compressed before storage or transmission and decompressed before display. The compression process is usually referred to as encoding and the decompression process is usually referred to as decoding. There are various video coding formats which use standardized video coding technologies, most commonly based on prediction, transform, quantization, entropy coding and in-loop filtering. The video coding standards, such as the High Efficiency Video Coding (HEVC/H.265) standard, the Versatile Video Coding (VVC/H.266) standard, AVS standards, specifying the specific video coding formats, are developed by standardization organizations. With more and more advanced video coding technologies being adopted in the video standards, the coding efficiency of the new video coding standards get higher and higher.

SUMMARY OF THE DISCLOSURE

Embodiments of the present disclosure provide a residual coding method, including: receiving control information for coding a video sequence; and determining, based on the control information, a coding method for coding a prediction residual signal of a coding block in the video sequence the coding method being one of a transform residual coding and a transform-skip residual coding.

Embodiments of the present disclosure also provide a system for processing video signals with residual coding. The system includes: a memory for storing a set of instructions; and at least one processor configured to execute the set of instructions for causing the system to perform: receiving control information for coding a video sequence; and determining, based on the control information, a coding method for coding a prediction residual signal of a coding block in the video sequence, the coding method being one of a transform residual coding and a transform-skip residual coding.

Embodiments of the present disclosure also provide a non-transitory computer readable medium storing instructions that are executable by at least one processor of a computer system, wherein the execution of the instructions causes the computer system to perform a method including: receiving control information for coding a video sequence; and determining, based on the control information, a coding method for coding a prediction residual signal of a coding block in the video sequence, the coding method being one of a transform residual coding and a transform-skip residual coding.

BRIEF DESCRIPTION OF THE DRAWINGS

Embodiments and various aspects of the present disclosure are illustrated in the following detailed description and the accompanying figures. Various features shown in the figures are not drawn to scale.

FIG. 1 illustrates structures of an exemplary video sequence, consistent with embodiments of the disclosure, consistent with embodiments of the disclosure.

FIG. 5 illustrates an exemplary transform unit syntax, consistent with embodiments of the disclosure.

FIG. 6 illustrates an exemplary SPS syntax for using sps_bdpcm_transform_residual_coding_flag, consistent with embodiments of the disclosure.

FIG. 7 illustrates an exemplary slice header syntax, consistent with embodiments of the disclosure.

FIG. 8 illustrates an exemplary transform block syntax, consistent with embodiments of the disclosure.

FIG. 9 illustrates an exemplary transform residual coding syntax, consistent with embodiments of the disclosure.

DETAILED DESCRIPTION

Figure 2A:
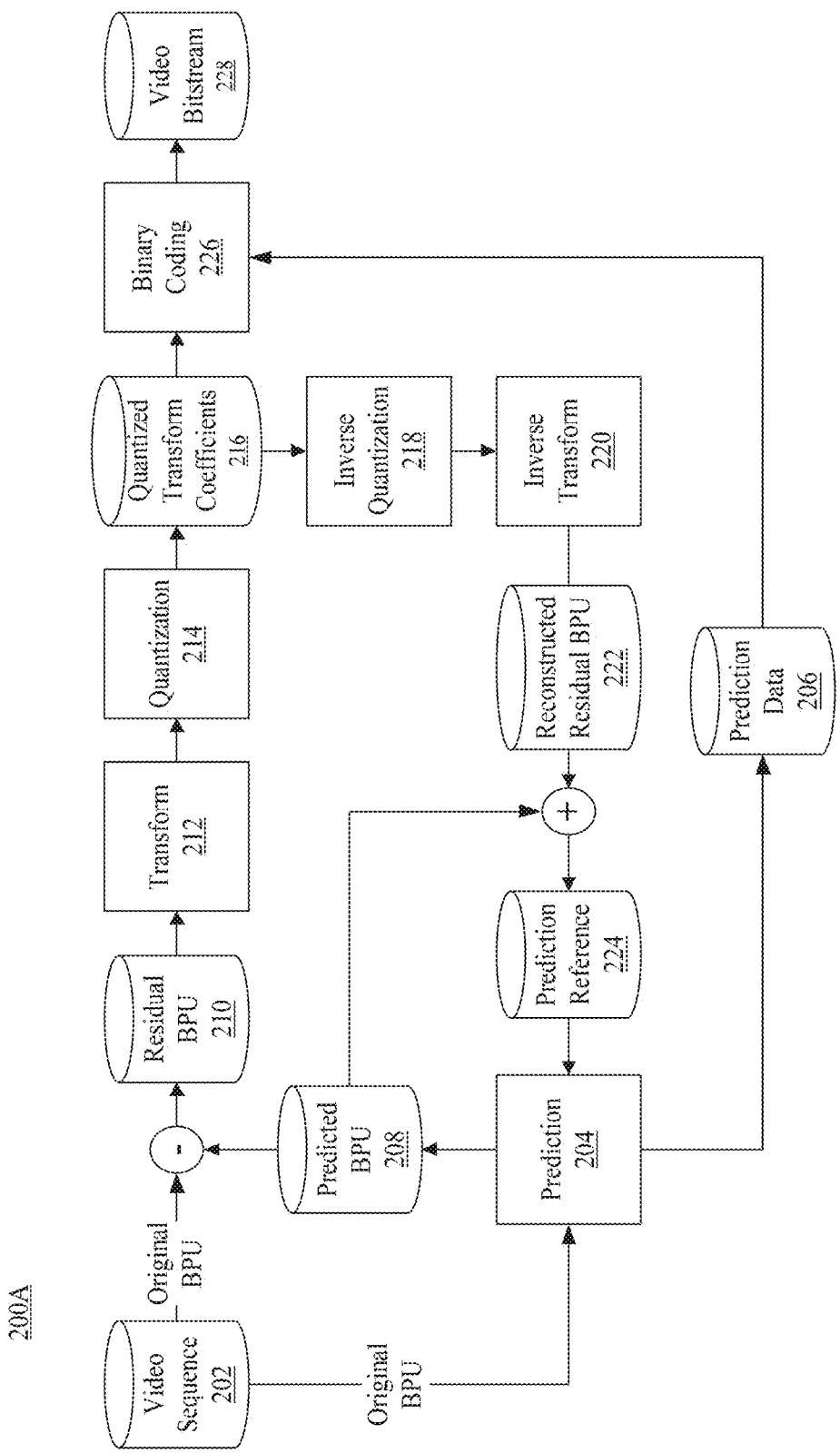
FIG. 2A illustrates a schematic diagram of an exemplary encoding process of a hybrid video coding system, consistent with embodiments of the disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims. Unless specifically stated otherwise, the term "or" encompasses all possible combinations, except where infeasible. For example, if it is stated that a component may include A or B, then, unless specifically stated otherwise or infeasible, the component may include A, or B, or A and B. As a second example, if it is stated that a component may include A, B, or C, then, unless specifically stated otherwise or infeasible, the component may include A, or B, or C, or A and B, or A and C, or B and C, or A and B and C.

Video coding systems are often used to compress digital video signals, for instance to reduce storage space consumed or to reduce transmission bandwidth consumption associated with such signals. With high-definition (HD) videos (e.g., having a resolution of 1920×1080 pixels) gaining popularity in various applications of video compression, such as online video streaming, video conferencing, or video monitoring, it is a continuous need to develop video coding tools that can increase compression efficiency of video data.

For example, video monitoring applications are increasingly and extensively used in many application scenarios (e.g., security, traffic, environment monitoring, or the like), and the numbers and resolutions of the monitoring devices keep growing rapidly. Many video monitoring application scenarios prefer to provide HD videos to users to capture more information, which has more pixels per frame to capture such information. However, an HD video bitstream can have a high bitrate that demands high bandwidth for transmission and large space for storage. For example, a monitoring video stream having an average 1920×1080 resolution can require a bandwidth as high as 4 Mbps for real-time transmission. Also, the video monitoring generally monitors 7×24 continuously, which can greatly challenge a storage system, if the video data is to be stored. The demand for high bandwidth and large storage of the HD videos has therefore become a major limitation to its large-scale deployment in video monitoring.

A video is a set of static pictures (or "frames") arranged in a temporal sequence to store visual information. A video capture device (e.g., a camera) can be used to capture and store those pictures in a temporal sequence, and a video playback device (e.g., a television, a computer, a smartphone, a tablet computer, a video player, or any end-user terminal with a function of display) can be used to display such pictures in the temporal sequence. Also, in some applications, a video capturing device can transmit the captured video to the video playback device (e.g., a computer with a monitor) in real-time, such as for monitoring, conferencing, or live broadcasting.

For reducing the storage space and the transmission bandwidth needed by such applications, the video can be compressed before storage and transmission and decompressed before the display. The compression and decompression can be implemented by software executed by a processor (e.g., a processor of a generic computer) or specialized hardware. The module for compression is generally referred to as an "encoder," and the module for decompression is generally referred to as a "decoder." The encoder and decoder can be collectively referred to as a "codec." The encoder and decoder can be implemented as any of a variety of suitable hardware, software, or a combination thereof. For example, the hardware implementation of the encoder and decoder can include circuitry, such as one or more microprocessors, digital signal processors (DSPs), application-specific integrated circuits (ASICs), field-programmable gate arrays (FPGAs), discrete logic, or any combinations thereof. The software implementation of the encoder and decoder can include program codes, computer-executable instructions, firmware, or any suitable computer-implemented algorithm or process fixed in a computer-readable medium. Video compression and decompression can be implemented by various algorithms or standards, such as MPEG-1, MPEG-2, MPEG-4, H.26x series, or the like. In some applications, the codec can decompress the video from a first coding standard and re-compress the decompressed video using a second coding standard, in which case the codec can be referred to as a "transcoder."

The video encoding process can identify and keep useful information that can be used to reconstruct a picture and disregard unimportant information for the reconstruction. If the disregarded, unimportant information cannot be fully reconstructed, such an encoding process can be referred to as "lossy." Otherwise, it can be referred to as "lossless." Most encoding processes are lossy, which is a tradeoff to reduce the needed storage space and the transmission bandwidth.

The useful information of a picture being encoded (referred to as a "current picture") include changes with respect to a reference picture (e.g., a picture previously encoded and reconstructed). Such changes can include position changes, luminosity changes, or color changes of the pixels, among which the position changes are mostly concerned. Position changes of a group of pixels that represent an object can reflect the motion of the object between the reference picture and the current picture.

A picture coded without referencing another picture (i.e., it is its own reference picture) is referred to as an "I-picture." A picture coded using a previous picture as a reference picture is referred to as a "P-picture." A picture coded using both a previous picture and a future picture as reference pictures (i.e., the reference is "bi-directional") is referred to as a "B-picture."

As previously mentioned, video monitoring that uses HD videos faces challenges of demands of high bandwidth and large storage. For addressing such challenges, the bitrate of the encoded video can be reduced. Among the I-, P-, and B-pictures, I-pictures have the highest bitrate. Because the backgrounds of most monitoring videos are nearly static, one way to reduce the overall bitrate of the encoded video can be using fewer I-pictures for video encoding.

However, the improvement of using fewer I-pictures can be trivial because the I-pictures are typically not dominant in the encoded video. For example, in a typical video bitstream, the ratio of I-, B-, and P-pictures can be 1:20:9, in which the I-pictures can account for less than 10% of the total bitrate. In other words, in such an example, even all I-pictures are removed, the reduced bitrate can be no more than 10%.

FIG. 1 illustrates structures of an example video sequence 100, consistent with embodiments of the disclosure. Video sequence 100 can be a live video or a video having been captured and archived. Video 100 can be a real-life video, a computer-generated video (e.g., computer game video), or a combination thereof (e.g., a real-life video with augmented-reality effects). Video sequence 100 can be inputted from a video capture device (e.g., a camera), a video archive (e.g., a video file stored in a storage device) containing previously captured video, or a video feed interface (e.g., a video broadcast transceiver) to receive video from a video content provider.

As shown in FIG. 1, video sequence 100 can include a series of pictures arranged temporally along a timeline, including pictures 102, 104, 106, and 108. Pictures 102-106 are continuous, and there are more pictures between pictures 106 and 108. In FIG. 1, picture 102 is an I-picture, the reference picture of which is picture 102 itself. Picture 104 is a P-picture, the reference picture of which is picture 102, as indicated by the arrow. Picture 106 is a B-picture, the reference pictures of which are pictures 104 and 108, as indicated by the arrows. In some embodiments, the reference picture of a picture (e.g., picture 104) can be not immediately preceding or following the picture. For example, the reference picture of picture 104 can be a picture preceding picture 102. It should be noted that the reference pictures of pictures 102-106 are only examples, and this disclosure does not limit embodiments of the reference pictures as the examples shown in FIG. 1.

Typically, video codecs do not encode or decode an entire picture at one time due to the computing complexity of such tasks. Rather, they can split the picture into basic segments, and encode or decode the picture segment by segment. Such basic segments are referred to as basic processing units ("BPUs") in this disclosure. For example, structure 110 in FIG. 1 shows an example structure of a picture of video sequence 100 (e.g., any of pictures 102-108). In structure 110, a picture is divided into 4×4 basic processing units, the boundaries of which are shown as dash lines. In some embodiments, the basic processing units can be referred to as "macroblocks" in some video coding standards (e.g., MPEG family, H.261, H.263, or H.264/AVC), or as "coding tree units" ("CTUs") in some other video coding standards (e.g., H.265/HEVC or H.266/VVC). The basic processing units can have variable sizes in a picture, such as 128×128, 64×64, 32×32, 16×16, 4×8, 16×32, or any arbitrary shape and size of pixels. The sizes and shapes of the basic processing units can be selected for a picture based on the balance of coding efficiency and levels of details to be kept in the basic processing unit.

The basic processing units can be logical units, which can include a group of different types of video data stored in a computer memory (e.g., in a video frame buffer). For example, a basic processing unit of a color picture can include a luma component (Y) representing achromatic brightness information, one or more chroma components (e.g., Cb and Cr) representing color information, and associated syntax elements, in which the luma and chroma components can have the same size of the basic processing unit. The luma and chroma components can be referred to as "coding tree blocks" ("CTBs") in some video coding standards (e.g., H.265/HEVC or H.266/VVC). Any operation performed to a basic processing unit can be repeatedly performed to each of its luma and chroma components.

Video coding has multiple stages of operations, examples of which will be detailed in FIGS. 2A-2B and 3A-3B. For each stage, the size of the basic processing units can still be too large for processing, and thus can be further divided into segments referred to as "basic processing sub-units" in this disclosure. In some embodiments, the basic processing sub-units can be referred to as "blocks" in some video coding standards (e.g., MPEG family, H.261, H.263, or H.264/AVC), or as "coding units" ("CUs") in some other video coding standards (e.g., H.265/HEVC or H.266/VVC). A basic processing sub-unit can have the same or smaller size than the basic processing unit. Similar to the basic processing units, basic processing sub-units are also logical units, which can include a group of different types of video data (e.g., Y, Cb, Cr, and associated syntax elements) stored in a computer memory (e.g., in a video frame buffer). Any operation performed to a basic processing sub-unit can be repeatedly performed to each of its luma and chroma components. It should be noted that such division can be performed to further levels depending on processing needs. It should also be noted that different stages can divide the basic processing units using different schemes.

For example, at a mode decision stage (an example of which will be detailed in FIG. 2B), the encoder can decide what prediction mode (e.g., intra-picture prediction or inter-picture prediction) to use for a basic processing unit, which can be too large to make such a decision. The encoder can split the basic processing unit into multiple basic processing sub-units (e.g., CUs as in H.265/HEVC or H.266/VVC), and decide a prediction type for each individual basic processing sub-unit.

For another example, at a prediction stage (an example of which will be detailed in FIG. 2A), the encoder can perform prediction operation at the level of basic processing sub-units (e.g., CUs). However, in some cases, a basic processing sub-unit can still be too large to process. The encoder can further split the basic processing sub-unit into smaller segments (e.g., referred to as "prediction blocks" or "PBs" in H.265/HEVC or H.266/VVC), at the level of which the prediction operation can be performed.

For another example, at a transform stage (an example of which will be detailed in FIG. 2A), the encoder can perform a transform operation for residual basic processing sub-units (e.g., CUs). However, in some cases, a basic processing sub-unit can still be too large to process. The encoder can further split the basic processing sub-unit into smaller segments (e.g., referred to as "transform blocks" or "TBs" in H.265/HEVC or H.266/VVC), at the level of which the transform operation can be performed. It should be noted that the division schemes of the same basic processing sub-unit can be different at the prediction stage and the transform stage. For example, in H.265/HEVC or H.266/VVC, the prediction blocks and transform blocks of the same CU can have different sizes and numbers.

In structure 110 of FIG. 1, basic processing unit 112 is further divided into 3×3 basic processing sub-units, the boundaries of which are shown as dotted lines. Different basic processing units of the same picture can be divided into basic processing sub-units in different schemes.

In some implementations, to provide the capability of parallel processing and error resilience to video encoding and decoding, a picture can be divided into regions for processing, such that, for a region of the picture, the encoding or decoding process can depend on no information from any other region of the picture. In other words, each region of the picture can be processed independently. By doing so, the codec can process different regions of a picture in parallel, thus increasing the coding efficiency. Also, when data of a region is corrupted in the processing or lost in network transmission, the codec can correctly encode or decode other regions of the same picture without reliance on the corrupted or lost data, thus providing the capability of error resilience. In some video coding standards, a picture can be divided into different types of regions. For example, H.265/HEVC and H.266/VVC provide two types of regions: "slices" and "tiles." It should also be noted that different pictures of video sequence 100 can have different partition schemes for dividing a picture into regions.

For example, in FIG. 1, structure 110 is divided into three regions 114, 116, and 118, the boundaries of which are shown as solid lines inside structure 110. Region 114 includes four basic processing units. Each of regions 116 and 118 includes six basic processing units. It should be noted that the basic processing units, basic processing sub-units, and regions of structure 110 in FIG. 1 are only examples, and this disclosure does not limit embodiments thereof.

FIG. 2A illustrates a schematic diagram of an example encoding process 200A, consistent with embodiments of the disclosure. For example, the encoding process 200A can be performed by an encoder. As shown in FIG. 2A, the encoder can encode video sequence 202 into video bitstream 228 according to process 200A. Similar to video sequence 100 in FIG. 1, video sequence 202 can include a set of pictures (referred to as "original pictures") arranged in a temporal order. Similar to structure 110 in FIG. 1, each original picture of video sequence 202 can be divided by the encoder into basic processing units, basic processing sub-units, or regions for processing. In some embodiments, the encoder can perform process 200A at the level of basic processing units for each original picture of video sequence 202. For example, the encoder can perform process 200A in an iterative manner, in which the encoder can encode a basic processing unit in one iteration of process 200A. In some embodiments, the encoder can perform process 200A in parallel for regions (e.g., regions 114-118) of each original picture of video sequence 202.

In FIG. 2A, the encoder can feed a basic processing unit (referred to as an "original BPU") of an original picture of video sequence 202 to prediction stage 204 to generate prediction data 206 and predicted BPU 208. The encoder can subtract predicted BPU 208 from the original BPU to generate residual BPU 210. The encoder can feed residual BPU 210 to transform stage 212 and quantization stage 214 to generate quantized transform coefficients 216. The encoder can feed prediction data 206 and quantized transform coefficients 216 to binary coding stage 226 to generate video bitstream 228. Components 202, 204, 206, 208, 210, 212, 214, 216, 226, and 228 can be referred to as a "forward path." During process 200A, after quantization stage 214, the encoder can feed quantized transform coefficients 216 to inverse quantization stage 218 and inverse transform stage 220 to generate reconstructed residual BPU 222. The encoder can add reconstructed residual BPU 222 to predicted BPU 208 to generate prediction reference 224, which is used in prediction stage 204 for the next iteration of process 200A. Components 218, 220, 222, and 224 of process 200A can be referred to as a "reconstruction path." The reconstruction path can be used to ensure that both the encoder and the decoder use the same reference data for prediction.

The encoder can perform process 200A iteratively to encode each original BPU of the original picture (in the forward path) and generate predicted reference 224 for encoding the next original BPU of the original picture (in the reconstruction path). After encoding all original BPUs of the original picture, the encoder can proceed to encode the next picture in video sequence 202.

Referring to process 200A, the encoder can receive video sequence 202 generated by a video capturing device (e.g., a camera). The term "receive" used herein can refer to receiving, inputting, acquiring, retrieving, obtaining, reading, accessing, or any action in any manner for inputting data.

At prediction stage 204, at a current iteration, the encoder can receive an original BPU and prediction reference 224, and perform a prediction operation to generate prediction data 206 and predicted BPU 208. Prediction reference 224 can be generated from the reconstruction path of the previous iteration of process 200A. The purpose of prediction stage 204 is to reduce information redundancy by extracting prediction data 206 that can be used to reconstruct the original BPU as predicted BPU 208 from prediction data 206 and prediction reference 224.

Ideally, predicted BPU 208 can be identical to the original BPU. However, due to non-ideal prediction and reconstruction operations, predicted BPU 208 is generally slightly different from the original BPU. For recording such differences, after generating predicted BPU 208, the encoder can subtract it from the original BPU to generate residual BPU 210. For example, the encoder can subtract values (e.g., greyscale values or RGB values) of pixels of predicted BPU 208 from values of corresponding pixels of the original BPU. Each pixel of residual BPU 210 can have a residual value as a result of such subtraction between the corresponding pixels of the original BPU and predicted BPU 208. Compared with the original BPU, prediction data 206 and residual BPU 210 can have fewer bits, but they can be used to reconstruct the original BPU without significant quality deterioration. Thus, the original BPU is compressed.

To further compress residual BPU 210, at transform stage 212, the encoder can reduce spatial redundancy of residual BPU 210 by decomposing it into a set of two-dimensional "base patterns," each base pattern being associated with a "transform coefficient." The base patterns can have the same size (e.g., the size of residual BPU 210). Each base pattern can represent a variation frequency (e.g., frequency of brightness variation) component of residual BPU 210. None of the base patterns can be reproduced from any combinations (e.g., linear combinations) of any other base patterns. In other words, the decomposition can decompose variations of residual BPU 210 into a frequency domain. Such a decomposition is analogous to a discrete Fourier transform of a function, in which the base patterns are analogous to the base functions (e.g., trigonometry functions) of the discrete Fourier transform, and the transform coefficients are analogous to the coefficients associated with the base functions.

Different transform algorithms can use different base patterns. Various transform algorithms can be used at transform stage 212, such as, for example, a discrete cosine transform, a discrete sine transform, or the like. The transform at transform stage 212 is invertible. That is, the encoder can restore residual BPU 210 by an inverse operation of the transform (referred to as an "inverse transform"). For example, to restore a pixel of residual BPU 210, the inverse transform can be multiplying values of corresponding pixels of the base patterns by respective associated coefficients and adding the products to produce a weighted sum. For a video coding standard, both the encoder and decoder can use the same transform algorithm (thus the same base patterns). Thus, the encoder can record only the transform coefficients, from which the decoder can reconstruct residual BPU 210 without receiving the base patterns from the encoder. Compared with residual BPU 210, the transform coefficients can have fewer bits, but they can be used to reconstruct residual BPU 210 without significant quality deterioration. Thus, residual BPU 210 is further compressed.

The encoder can further compress the transform coefficients at quantization stage 214. In the transform process, different base patterns can represent different variation frequencies (e.g., brightness variation frequencies). Because human eyes are generally better at recognizing low-frequency variation, the encoder can disregard information of high-frequency variation without causing significant quality deterioration in decoding. For example, at quantization stage 214, the encoder can generate quantized transform coefficients 216 by dividing each transform coefficient by an integer value (referred to as a "quantization parameter") and rounding the quotient to its nearest integer. After such an operation, some transform coefficients of the high-frequency base patterns can be converted to zero, and the transform coefficients of the low-frequency base patterns can be converted to smaller integers. The encoder can disregard the zero-value quantized transform coefficients 216, by which the transform coefficients are further compressed. The quantization process is also invertible, in which quantized transform coefficients 216 can be reconstructed to the transform coefficients in an inverse operation of the quantization (referred to as "inverse quantization").

Because the encoder disregards the remainders of such divisions in the rounding operation, quantization stage 214 can be lossy. Typically, quantization stage 214 can contribute the most information loss in process 200A. The larger the information loss is, the fewer bits the quantized transform coefficients 216 can need. For obtaining different levels of information loss, the encoder can use different values of the quantization parameter or any other parameter of the quantization process.

At binary coding stage 226, the encoder can encode prediction data 206 and quantized transform coefficients 216 using a binary coding technique, such as, for example, entropy coding, variable length coding, arithmetic coding, Huffman coding, context-adaptive binary arithmetic coding, or any other lossless or lossy compression algorithm. In some embodiments, besides prediction data 206 and quantized transform coefficients 216, the encoder can encode other information at binary coding stage 226, such as, for example, a prediction mode used at prediction stage 204, parameters of the prediction operation, a transform type at transform stage 212, parameters of the quantization process (e.g., quantization parameters), an encoder control parameter (e.g., a bitrate control parameter), or the like. The encoder can use the output data of binary coding stage 226 to generate video bitstream 228. In some embodiments, video bitstream 228 can be further packetized for network transmission.

Referring to the reconstruction path of process 200A, at inverse quantization stage 218, the encoder can perform inverse quantization on quantized transform coefficients 216 to generate reconstructed transform coefficients. At inverse transform stage 220, the encoder can generate reconstructed residual BPU 222 based on the reconstructed transform coefficients. The encoder can add reconstructed residual BPU 222 to predicted BPU 208 to generate prediction reference 224 that is to be used in the next iteration of process 200A.

It should be noted that other variations of the process 200A can be used to encode video sequence 202. In some embodiments, stages of process 200A can be performed by the encoder in different orders. In some embodiments, one or more stages of process 200A can be combined into a single stage. In some embodiments, a single stage of process 200A can be divided into multiple stages. For example, transform stage 212 and quantization stage 214 can be combined into a single stage. In some embodiments, process 200A can include additional stages. In some embodiments, process 200A can omit one or more stages in FIG. 2A.

Figure 2B:
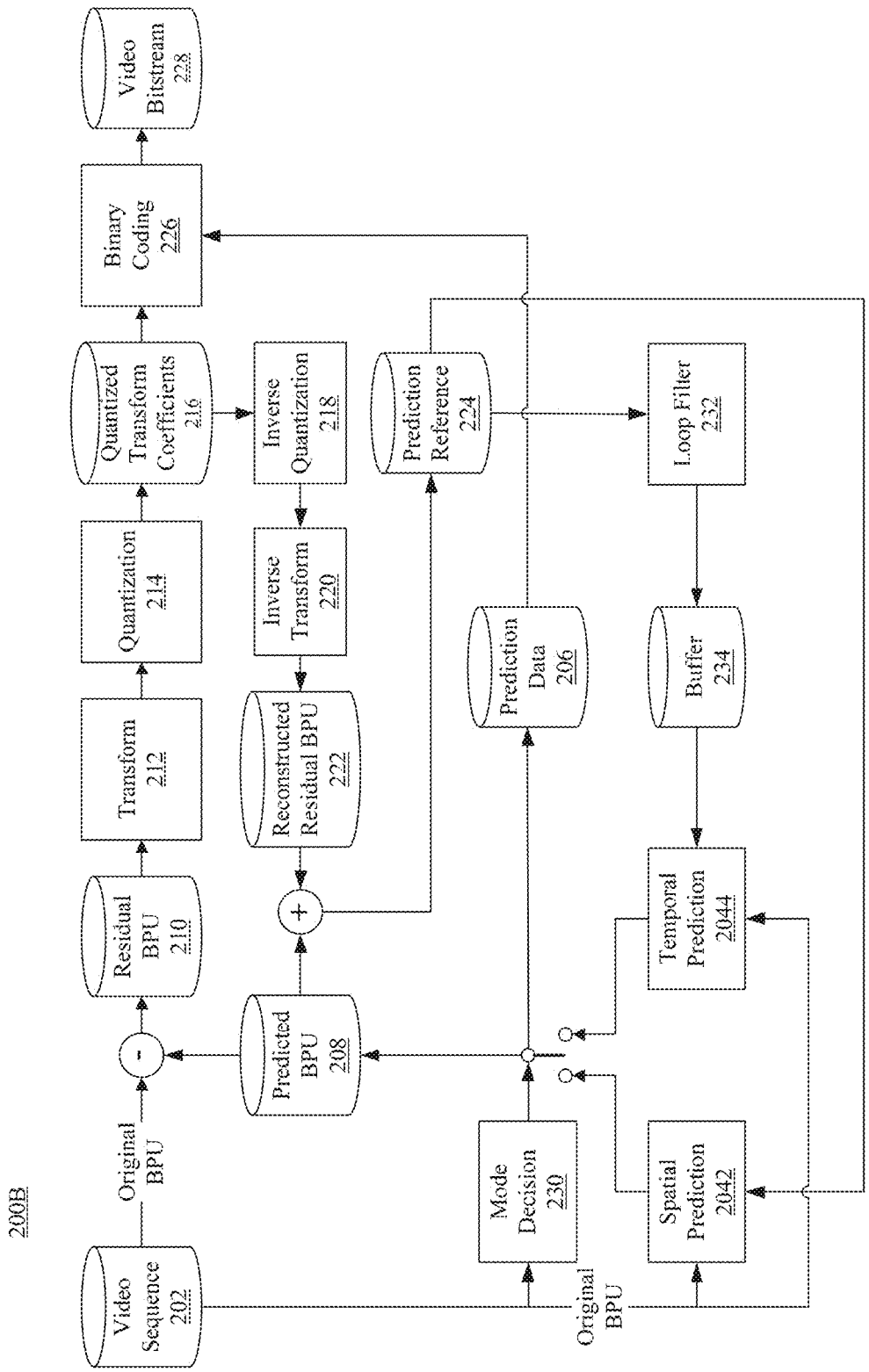
FIG. 2B illustrates a schematic diagram of another exemplary encoding process of a hybrid video coding system, consistent with embodiments of the disclosure.

FIG. 2B illustrates a schematic diagram of another example encoding process 200B, consistent with embodiments of the disclosure. Process 200B can be modified from process 200A. For example, process 200B can be used by an encoder conforming to a hybrid video coding standard (e.g., H.26x series). Compared with process 200A, the forward path of process 200B additionally includes mode decision stage 230 and divides prediction stage 204 into spatial prediction stage 2042 and temporal prediction stage 2044. The reconstruction path of process 200B additionally includes loop filter stage 232 and buffer 234.

Generally, prediction techniques can be categorized into two types: spatial prediction and temporal prediction. Spatial prediction (e.g., an intra-picture prediction or "intra prediction") can use pixels from one or more already coded neighboring BPUs in the same picture to predict the current BPU. That is, prediction reference 224 in the spatial prediction can include the neighboring BPUs. The spatial prediction can reduce the inherent spatial redundancy of the picture. Temporal prediction (e.g., an inter-picture prediction or "inter prediction") can use regions from one or more already coded pictures to predict the current BPU. That is, prediction reference 224 in the temporal prediction can include the coded pictures. The temporal prediction can reduce the inherent temporal redundancy of the pictures.

Referring to process 200B, in the forward path, the encoder performs the prediction operation at spatial prediction stage 2042 and temporal prediction stage 2044. For example, at spatial prediction stage 2042, the encoder can perform the intra prediction. For an original BPU of a picture being encoded, prediction reference 224 can include one or more neighboring BPUs that have been encoded (in the forward path) and reconstructed (in the reconstructed path) in the same picture. The encoder can generate predicted BPU 208 by extrapolating the neighboring BPUs. The extrapolation technique can include, for example, a linear extrapolation or interpolation, a polynomial extrapolation or interpolation, or the like. In some embodiments, the encoder can perform the extrapolation at the pixel level, such as by extrapolating values of corresponding pixels for each pixel of predicted BPU 208. The neighboring BPUs used for extrapolation can be located with respect to the original BPU from various directions, such as in a vertical direction (e.g., on top of the original BPU), a horizontal direction (e.g., to the left of the original BPU), a diagonal direction (e.g., to the down-left, down-right, up-left, or up-right of the original BPU), or any direction defined in the used video coding standard. For the intra prediction, prediction data 206 can include, for example, locations (e.g., coordinates) of the used neighboring BPUs, sizes of the used neighboring BPUs, parameters of the extrapolation, a direction of the used neighboring BPUs with respect to the original BPU, or the like.

For another example, at temporal prediction stage 2044, the encoder can perform the inter prediction. For an original BPU of a current picture, prediction reference 224 can include one or more pictures (referred to as "reference pictures") that have been encoded (in the forward path) and reconstructed (in the reconstructed path). In some embodiments, a reference picture can be encoded and reconstructed BPU by BPU. For example, the encoder can add reconstructed residual BPU 222 to predicted BPU 208 to generate a reconstructed BPU. When all reconstructed BPUs of the same picture are generated, the encoder can generate a reconstructed picture as a reference picture. The encoder can perform an operation of "motion estimation" to search for a matching region in a scope (referred to as a "search window") of the reference picture. The location of the search window in the reference picture can be determined based on the location of the original BPU in the current picture. For example, the search window can be centered at a location having the same coordinates in the reference picture as the original BPU in the current picture and can be extended out for a predetermined distance. When the encoder identifies (e.g., by using a pel-recursive algorithm, a block-matching algorithm, or the like) a region similar to the original BPU in the search window, the encoder can determine such a region as the matching region. The matching region can have different dimensions (e.g., being smaller than, equal to, larger than, or in a different shape) from the original BPU. Because the reference picture and the current picture are temporally separated in the timeline (e.g., as shown in FIG. 1), it can be deemed that the matching region "moves" to the location of the original BPU as time goes by. The encoder can record the direction and distance of such a motion as a "motion vector." When multiple reference pictures are used (e.g., as picture 106 in FIG. 1), the encoder can search for a matching region and determine its associated motion vector for each reference picture. In some embodiments, the encoder can assign weights to pixel values of the matching regions of respective matching reference pictures.

The motion estimation can be used to identify various types of motions, such as, for example, translations, rotations, zooming, or the like. For inter prediction, prediction data 206 can include, for example, locations (e.g., coordinates) of the matching region, the motion vectors associated with the matching region, the number of reference pictures, weights associated with the reference pictures, or the like.

For generating predicted BPU 208, the encoder can perform an operation of "motion compensation." The motion compensation can be used to reconstruct predicted BPU 208 based on prediction data 206 (e.g., the motion vector) and prediction reference 224. For example, the encoder can move the matching region of the reference picture according to the motion vector, in which the encoder can predict the original BPU of the current picture. When multiple reference pictures are used (e.g., as picture 106 in FIG. 1), the encoder can move the matching regions of the reference pictures according to the respective motion vectors and average pixel values of the matching regions. In some embodiments, if the encoder has assigned weights to pixel values of the matching regions of respective matching reference pictures, the encoder can add a weighted sum of the pixel values of the moved matching regions.

In some embodiments, the inter prediction can be unidirectional or bidirectional. Unidirectional inter predictions can use one or more reference pictures in the same temporal direction with respect to the current picture. For example, picture 104 in FIG. 1 is a unidirectional inter-predicted picture, in which the reference picture (i.e., picture 102) precedes picture 104. Bidirectional inter predictions can use one or more reference pictures at both temporal directions with respect to the current picture. For example, picture 106 in FIG. 1 is a bidirectional inter-predicted picture, in which the reference pictures (i.e., pictures 104 and 108) are at both temporal directions with respect to picture 104.

Still referring to the forward path of process 200B, after spatial prediction 2042 and temporal prediction stage 2044, at mode decision stage 230, the encoder can select a prediction mode (e.g., one of the intra prediction or the inter prediction) for the current iteration of process 200B. For example, the encoder can perform a rate-distortion optimization technique, in which the encoder can select a prediction mode to minimize a value of a cost function depending on a bit rate of a candidate prediction mode and distortion of the reconstructed reference picture under the candidate prediction mode. Depending on the selected prediction mode, the encoder can generate the corresponding predicted BPU 208 and predicted data 206.

In the reconstruction path of process 200B, if intra prediction mode has been selected in the forward path, after generating prediction reference 224 (e.g., the current BPU that has been encoded and reconstructed in the current picture), the encoder can directly feed prediction reference 224 to spatial prediction stage 2042 for later usage (e.g., for extrapolation of a next BPU of the current picture). If the inter prediction mode has been selected in the forward path, after generating prediction reference 224 (e.g., the current picture in which all BPUs have been encoded and reconstructed), the encoder can feed prediction reference 224 to loop filter stage 232, at which the encoder can apply a loop filter to prediction reference 224 to reduce or eliminate distortion (e.g., blocking artifacts) introduced by the inter prediction. The encoder can apply various loop filter techniques at loop filter stage 232, such as, for example, deblocking, sample adaptive offsets, adaptive loop filters, or the like. The loop-filtered reference picture can be stored in buffer 234 (or "decoded picture buffer") for later use (e.g., to be used as an inter-prediction reference picture for a future picture of video sequence 202). The encoder can store one or more reference pictures in buffer 234 to be used at temporal prediction stage 2044. In some embodiments, the encoder can encode parameters of the loop filter (e.g., a loop filter strength) at binary coding stage 226, along with quantized transform coefficients 216, prediction data 206, and other information.

Figure 3A:
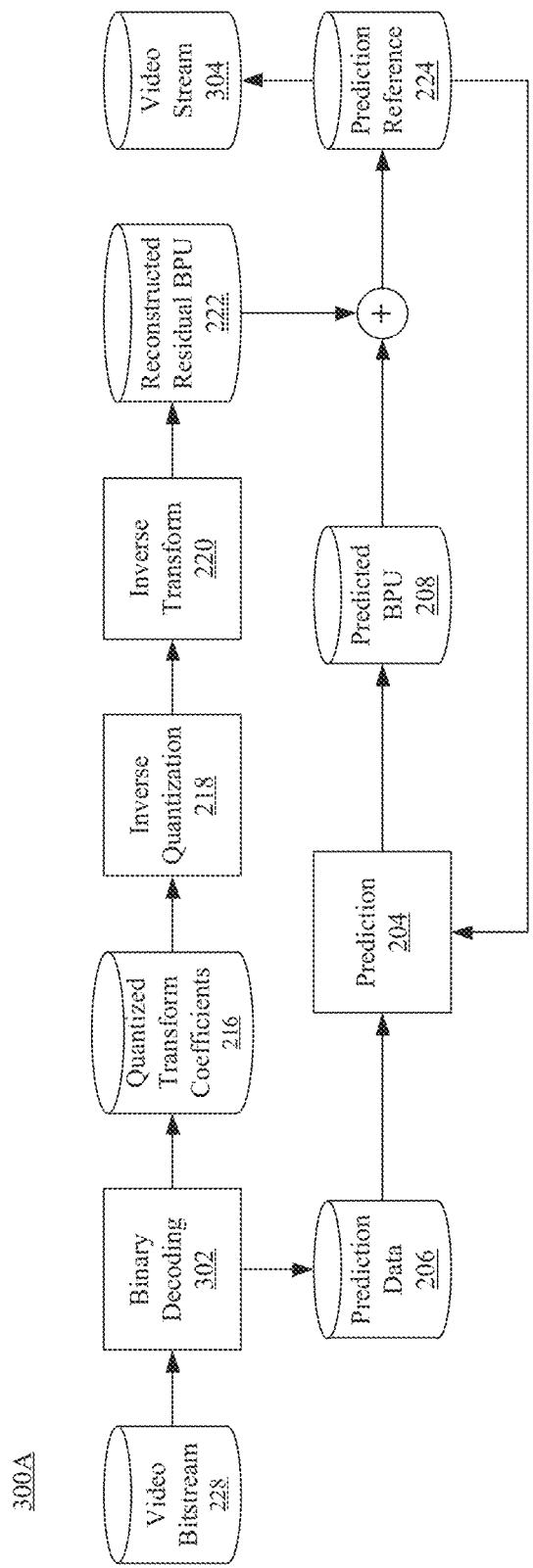
FIG. 3A illustrates a schematic diagram of an exemplary decoding process of a hybrid video coding system, consistent with embodiments of the disclosure.

FIG. 3A illustrates a schematic diagram of an example decoding process 300A, consistent with embodiments of the disclosure. Process 300A can be a decompression process corresponding to the compression process 200A in FIG. 2A. In some embodiments, process 300A can be similar to the reconstruction path of process 200A. A decoder can decode video bitstream 228 into video stream 304 according to process 300A. Video stream 304 can be very similar to video sequence 202. However, due to the information loss in the compression and decompression process (e.g., quantization stage 214 in FIGS. 2A-2B), generally, video stream 304 is not identical to video sequence 202. Similar to processes 200A and 200B in FIGS. 2A-2B, the decoder can perform process 300A at the level of basic processing units (BPUs) for each picture encoded in video bitstream 228. For example, the decoder can perform process 300A in an iterative manner, in which the decoder can decode a basic processing unit in one iteration of process 300A. In some embodiments, the decoder can perform process 300A in parallel for regions (e.g., regions 114-118) of each picture encoded in video bitstream 228.

In FIG. 3A, the decoder can feed a portion of video bitstream 228 associated with a basic processing unit (referred to as an "encoded BPU") of an encoded picture to binary decoding stage 302. At binary decoding stage 302, the decoder can decode the portion into prediction data 206 and quantized transform coefficients 216. The decoder can feed quantized transform coefficients 216 to inverse quantization stage 218 and inverse transform stage 220 to generate reconstructed residual BPU 222. The decoder can feed prediction data 206 to prediction stage 204 to generate predicted BPU 208. The decoder can add reconstructed residual BPU 222 to predicted BPU 208 to generate predicted reference 224. In some embodiments, predicted reference 224 can be stored in a buffer (e.g., a decoded picture buffer in a computer memory). The decoder can feed predicted reference 224 to prediction stage 204 for performing a prediction operation in the next iteration of process 300A.

The decoder can perform process 300A iteratively to decode each encoded BPU of the encoded picture and generate predicted reference 224 for encoding the next encoded BPU of the encoded picture. After decoding all encoded BPUs of the encoded picture, the decoder can output the picture to video stream 304 for display and proceed to decode the next encoded picture in video bitstream 228.

At binary decoding stage 302, the decoder can perform an inverse operation of the binary coding technique used by the encoder (e.g., entropy coding, variable length coding, arithmetic coding, Huffman coding, context-adaptive binary arithmetic coding, or any other lossless compression algorithm). In some embodiments, besides prediction data 206 and quantized transform coefficients 216, the decoder can decode other information at binary decoding stage 302, such as, for example, a prediction mode, parameters of the prediction operation, a transform type, parameters of the quantization process (e.g., quantization parameters), an encoder control parameter (e.g., a bitrate control parameter), or the like. In some embodiments, if video bitstream 228 is transmitted over a network in packets, the decoder can depacketize video bitstream 228 before feeding it to binary decoding stage 302.

Figure 3B:
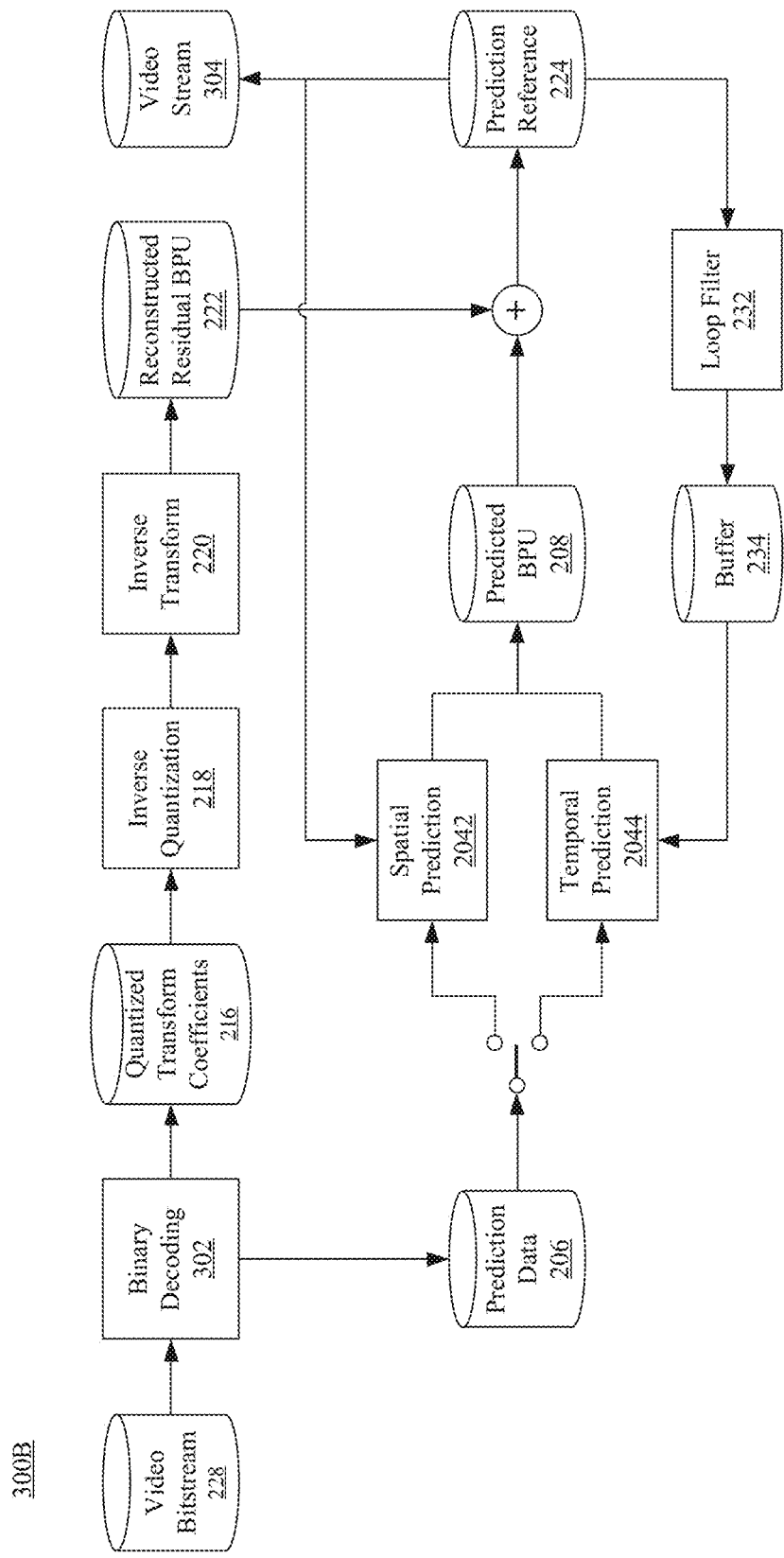
FIG. 3B illustrates a schematic diagram of another exemplary decoding process of a hybrid video coding system, consistent with embodiments of the disclosure.

FIG. 3B illustrates a schematic diagram of another example decoding process 300B, consistent with embodiments of the disclosure. Process 300B can be modified from process 300A. For example, process 300B can be used by a decoder conforming to a hybrid video coding standard (e.g., H.26x series). Compared with process 300A, process 300B additionally divides prediction stage 204 into spatial prediction stage 2042 and temporal prediction stage 2044, and additionally includes loop filter stage 232 and buffer 234.

In process 300B, for an encoded basic processing unit (referred to as a "current BPU") of an encoded picture (referred to as a "current picture") that is being decoded, prediction data 206 decoded from binary decoding stage 302 by the decoder can include various types of data, depending on what prediction mode was used to encode the current BPU by the encoder. For example, if intra prediction was used by the encoder to encode the current BPU, prediction data 206 can include a prediction mode indicator (e.g., a flag value) indicative of the intra prediction, parameters of the intra prediction operation, or the like. The parameters of the intra prediction operation can include, for example, locations (e.g., coordinates) of one or more neighboring BPUs used as a reference, sizes of the neighboring BPUs, parameters of extrapolation, a direction of the neighboring BPUs with respect to the original BPU, or the like. For another example, if inter prediction was used by the encoder to encode the current BPU, prediction data 206 can include a prediction mode indicator (e.g., a flag value) indicative of the inter prediction, parameters of the inter prediction operation, or the like. The parameters of the inter prediction operation can include, for example, the number of reference pictures associated with the current BPU, weights respectively associated with the reference pictures, locations (e.g., coordinates) of one or more matching regions in the respective reference pictures, one or more motion vectors respectively associated with the matching regions, or the like.

Based on the prediction mode indicator, the decoder can decide whether to perform a spatial prediction (e.g., the intra prediction) at spatial prediction stage 2042 or a temporal prediction (e.g., the inter prediction) at temporal prediction stage 2044. The details of performing such spatial prediction or temporal prediction are described in FIG. 2B and will not be repeated hereinafter. After performing such spatial prediction or temporal prediction, the decoder can generate predicted BPU 208. The decoder can add predicted BPU 208 and reconstructed residual BPU 222 to generate prediction reference 224, as described in FIG. 3A.

In process 300B, the decoder can feed predicted reference 224 to spatial prediction stage 2042 or temporal prediction stage 2044 for performing a prediction operation in the next iteration of process 300B. For example, if the current BPU is decoded using the intra prediction at spatial prediction stage 2042, after generating prediction reference 224 (e.g., the decoded current BPU), the decoder can directly feed prediction reference 224 to spatial prediction stage 2042 for later usage (e.g., for extrapolation of a next BPU of the current picture). If the current BPU is decoded using the inter prediction at temporal prediction stage 2044, after generating prediction reference 224 (e.g., a reference picture in which all BPUs have been decoded), the encoder can feed prediction reference 224 to loop filter stage 232 to reduce or eliminate distortion (e.g., blocking artifacts). The decoder can apply a loop filter to prediction reference 224, in a way as described in FIG. 2B. The loop-filtered reference picture can be stored in buffer 234 (e.g., a decoded picture buffer in a computer memory) for later use (e.g., to be used as an inter-prediction reference picture for a future encoded picture of video bitstream 228). The decoder can store one or more reference pictures in buffer 234 to be used at temporal prediction stage 2044. In some embodiments, when the prediction mode indicator of prediction data 206 indicates that inter prediction was used to encode the current BPU, prediction data can further include parameters of the loop filter (e.g., a loop filter strength).

Figure 4:
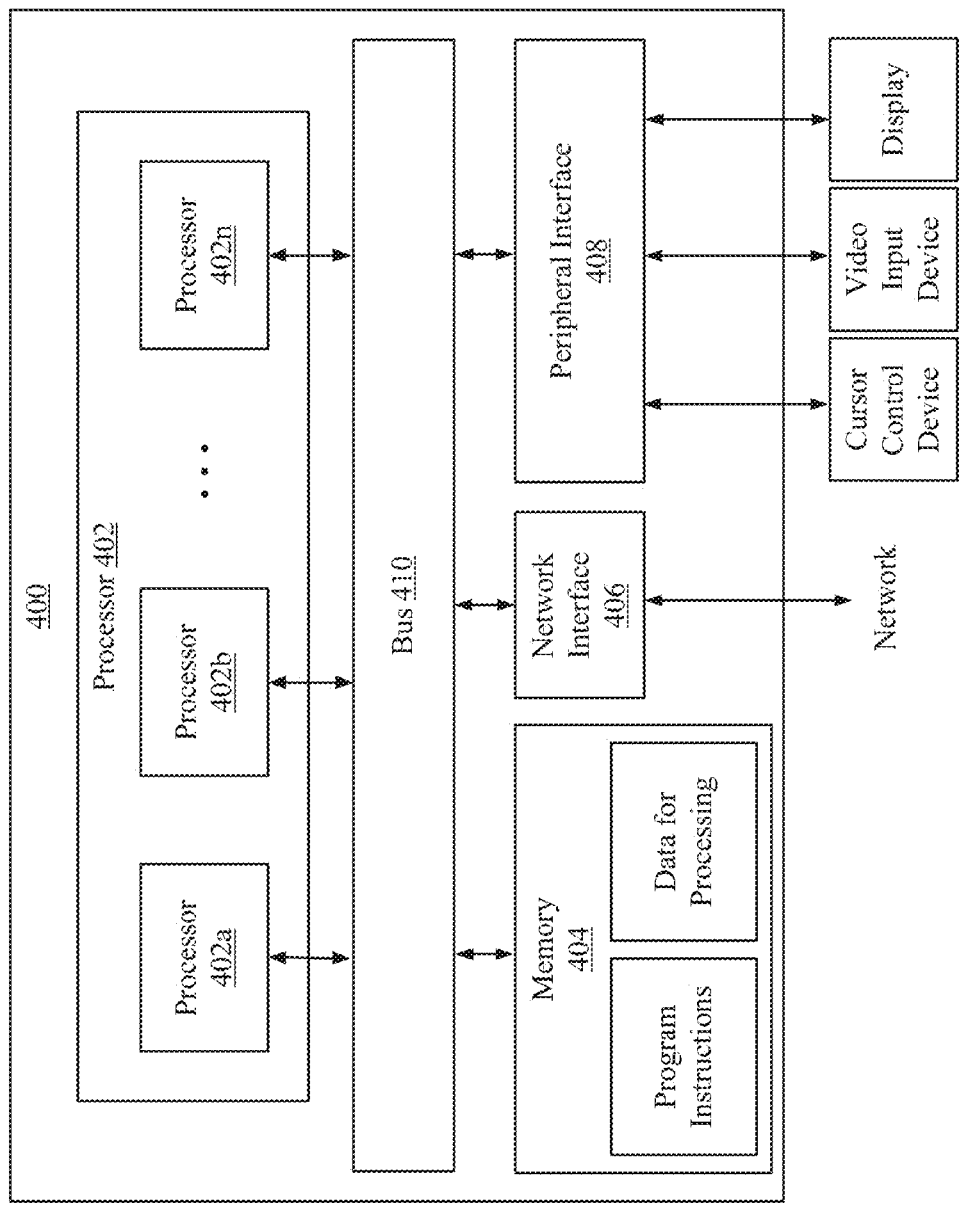
FIG. 4 is a block diagram of an exemplary apparatus for encoding or decoding a video, consistent with embodiments of the disclosure.

FIG. 4 is a block diagram of an example apparatus 400 for encoding or decoding a video, consistent with embodiments of the disclosure. As shown in FIG. 4, apparatus 400 can include processor 402. When processor 402 executes instructions described herein, apparatus 400 can become a specialized machine for video encoding or decoding. Processor 402 can be any type of circuitry capable of manipulating or processing information. For example, processor 402 can include any combination of any number of a central processing unit (or "CPU"), a graphics processing unit (or "GPU"), a neural processing unit ("NPU"), a microcontroller unit ("MCU"), an optical processor, a programmable logic controller, a microcontroller, a microprocessor, a digital signal processor, an intellectual property (IP) core, a Programmable Logic Array (PLA), a Programmable Array Logic (PAL), a Generic Array Logic (GAL), a Complex Programmable Logic Device (CPLD), a Field-Programmable Gate Array (FPGA), a System On Chip (SoC), an Application-Specific Integrated Circuit (ASIC), or the like. In some embodiments, processor 402 can also be a set of processors grouped as a single logical component. For example, as shown in FIG. 4, processor 402 can include multiple processors, including processor 402a, processor 402b, and processor 402n.

Apparatus 400 can also include memory 404 configured to store data (e.g., a set of instructions, computer codes, intermediate data, or the like). For example, as shown in FIG. 4, the stored data can include program instructions (e.g., program instructions for implementing the stages in processes 200A, 200B, 300A, or 300B) and data for processing (e.g., video sequence 202, video bitstream 228, or video stream 304). Processor 402 can access the program instructions and data for processing (e.g., via bus 410), and execute the program instructions to perform an operation or manipulation on the data for processing. Memory 404 can include a high-speed random-access storage device or a non-volatile storage device. In some embodiments, memory 404 can include any combination of any number of a random-access memory (RAM), a read-only memory (ROM), an optical disc, a magnetic disk, a hard drive, a solid-state drive, a flash drive, a security digital (SD) card, a memory stick, a compact flash (CF) card, or the like. Memory 404 can also be a group of memories (not shown in FIG. 4) grouped as a single logical component.

Bus 410 can be a communication device that transfers data between components inside apparatus 400, such as an internal bus (e.g., a CPU-memory bus), an external bus (e.g., a universal serial bus port, a peripheral component interconnect express port), or the like.

For ease of explanation without causing ambiguity, processor 402 and other data processing circuits are collectively referred to as a "data processing circuit" in this disclosure. The data processing circuit can be implemented entirely as hardware, or as a combination of software, hardware, or firmware. In addition, the data processing circuit can be a single independent module or can be combined entirely or partially into any other component of apparatus 400.

Apparatus 400 can further include network interface 406 to provide wired or wireless communication with a network (e.g., the Internet, an intranet, a local area network, a mobile communications network, or the like). In some embodiments, network interface 406 can include any combination of any number of a network interface controller (NIC), a radio frequency (RF) module, a transponder, a transceiver, a modem, a router, a gateway, a wired network adapter, a wireless network adapter, a Bluetooth adapter, an infrared adapter, an near-field communication ("NFC") adapter, a cellular network chip, or the like.

In some embodiments, optionally, apparatus 400 can further include peripheral interface 408 to provide a connection to one or more peripheral devices. As shown in FIG. 4, the peripheral device can include, but is not limited to, a cursor control device (e.g., a mouse, a touchpad, or a touchscreen), a keyboard, a display (e.g., a cathode-ray tube display, a liquid crystal display, or a light-emitting diode display), a video input device (e.g., a camera or an input interface coupled to a video archive), or the like.

It should be noted that video codecs (e.g., a codec performing process 200A, 200B, 300A, or 300B) can be implemented as any combination of any software or hardware modules in apparatus 400. For example, some or all stages of process 200A, 200B, 300A, or 300B can be implemented as one or more software modules of apparatus 400, such as program instructions that can be loaded into memory 404. For another example, some or all stages of process 200A, 200B, 300A, or 300B can be implemented as one or more hardware modules of apparatus 400, such as a specialized data processing circuit (e.g., an FPGA, an ASIC, an NPU, or the like).

The JVET ad hoc groups (AHG) lossless and near-lossless coding tools (AHG18) released a lossless software based on VVC test model 6.0 (VTM-6.0). This software introduced a coding unit (CU) level flag called cu_transquant_bypass_flag. When cu_transquant_bypass_flag=1, it means that transform and quantization of the prediction residual signal of that CU are skipped and the residual of that CU is coded directly in a lossless manner.

Similar to lossy VVC, the current lossless codec uses two types of residual coding techniques—transform-skip (TS) residual coding and transform residual coding. The TS residual coding is selected if one of the following two conditions are satisfied: 1) the intra_bdpcm_flag has a value equal to 1, or 2) transform_skip_flag has a value equal to 1. Transform residual coding is used if both of the above mentioned conditions are false.

Moreover, in the current lossless codec, if block differential pulse code modulation (BDPCM) is selected, transform skip (TS) residual coding is used. Otherwise, transform residual coding is used.

However, traditionally, both of the transform residual coding technique and TS residual coding technique in VVC 6 are designed for lossy codec. The statistical properties of the residual coefficients are different depending on if lossy or lossless coding is used. Therefore, in order to improve the coding efficiency, it is desirable to improve the existing residual coding method for lossless coding. The present disclosure provides various methods for selecting a proper residual coding technique for performing the lossless coding.

According to some embodiments, the residual coding methods on a video signal can include TS residual coding and transform residual coding.

The TS residual coding can be selected if both of the two conditions below are satisfied. The two conditions can include the video signal is a luma component and either intra_bdpcm_flag or transform_skip_flag is 1.

The transform residual coding can be selected if either of the two conditions above is false.

In some embodiments, transform skip and the BDPCM blocks can be allowed to select one of the TS residual coding and transform residual coding. The selection can be controlled by signaling an additional flag. The additional flag can be signaled at the CU level, the slice level, the picture level, or in the picture parameter set (PPS) or SPS.

For example, cu_transquant_bypass_flag can be signal at the CU level and used to select one of the two types of residual coding techniques for the lossless coding. If cu_transquant_bypass_flag is 1, transform residual coding is used regardless of the value of intra_bdpcm_flag or transform_skip_flag. Table 1 in FIG. 5 shows an exemplary transform unit syntax table, in which the syntax elements shown in dashed line box are proposed to implement the disclosed embodiments.

According to some embodiments, a Sequence Parameter Set (SPS) level flag "sps_bdpcm_transform_residual_coding_flag" is used to signal the residual coding technique used by a luma BDPCM block. Specifically, sps_bdpcm_transform_residual_coding_flag equal to 1 specifies that, if the BDPCM is applied to the current luma block (e.g., intra_bdpcm_flag=1), then the current luma block uses transform residual coding. Moreover, sps_bdpcm_transform_residual_coding_flag equal to 0 specifies that, if the BDPCM is applied to the current luma block (e.g., intra_bdpcm_flag=1), then the current luma block uses TS residual coding. Additionally, when sps_bdpcm_transform_residual_coding_flag is not present, it is inferred to be equal to 0.

In these embodiments, the sps_bdpcm_transform_residual_coding_flag is signaled based on a preset condition. As an example, sps_bdpcm_transform_residual_coding_flag is signaled when sps_bdpcm_enabled_flag is 1.

As another example, sps_bdpcm_transform_residual_coding_flag is signaled if both sps_bdpcm_enabled_flag and transquant_bypass_enabled_flag is 1. Table 2 in FIG. 6 shows an exemplary SPS syntax table for signaling sps_bdpcm_transform_residual_coding_flag based on both sps_bdpcm_enabled_flag and transquant_bypass_enabled_flag, in which the syntax elements shown in dashed line box are proposed to implement the disclosed embodiments. As shown in Table 2 (FIG. 6), sps_bdpcm_transform_residual_coding_flag equal to 1 specifies that, if the BDPCM is applied to the current luma block (e.g., intra_bdpcm_flag=1) and the current block is in transform and quantization bypass mode (e.g., cu_transquant_bypass_flag=1), then the current luma block use transform residual coding. Moreover, sps_bdpcm_transform_residual_coding_flag equal to 0 specifies that, if the BDPCM is applied to the current luma block (e.g., intra_bdpcm_flag=1) and the current block is in transform and quantization bypass mode (e.g., cu_transquant_bypass_flag=1), then the current luma block uses TS residual coding.

It is contemplated that although the above description uses luma block as an example to describe the residual coding process, the disclosed methods are readily applicable to residual coding of the chroma blocks as well.

In some embodiments, the selection of the residual coding methods can also be signaled in other levels, such as PPS, picture header, or slice header. For instance, the selection of TS residual coding can be controlled at the slice level. In that case, a slice level flag is provided to enable/disable the TS residual coding method. The semantic of the slice level flag is given below.

slice_ts_residual_coding_disabled_flag equal to 1 specifies that the residual_coding ( ) syntax structure is used to parse the residual samples of a transform skip and BDPCM block for the current slice. slice_ts_residual_coding_disabled_flag equal to 0 specifies that the residual_ts_coding ( ) syntax structure is used to parse the residual samples of a transform skip block for the current slice. When slice_ts_residual_coding_disabled_flag is not present, it is infered to be equal to 0.

Table 3 in FIG. 7 illustrates exemplary slice header syntax, in which the syntax elements shown in dashed line box are proposed to implement the disclosed embodiments. Table 4 in FIG. 8 illustrates exemplary transform block syntax, in which the syntax elements shown in dashed line box are proposed to implement the disclosed embodiments. In some embodiments, if the value slice_ts_residual_coding_disabled_flag is equal to 1, the transform-skip and BDPCM block use transformed residual coding method instead of TS residual coding method.

According to some embodiments of the disclosure, the signaling of the position of the last significant coefficient can be omitted for transform residual coding. In VVC 6's transform residual coding method, at the beginning of the residual coding of a transform block, the position of the last significant coefficient is signaled. In contrast, in the disclosed methods, if cu_transquant_bypass_flag=1, the position of the last significant coefficient is not signaled and the position is instead inferred to be the bottom-right position of the transform block. If cu_transquant_bypass_flag=0, the position of the last significant coefficient is signaled in the same way as in VVC 6.

In VVC 6's transform residual coding, the coded_sub_block_flag of the first and last sub-block are not signaled and inferred to be 1. In the disclosed methods, if cu_transquant_bypass_flag=1, the coded_sub_block_flag of all of the sub-blocks are signaled. However, if the coded_sub_block_flag of all of the previously coded sub-blocks are zero, the coded_sub_block_flag of first subblock is inferred to be 1. Similar to VVC 6, in the disclosed methods, if cu_transquant_bypass_flag=0, the first and last sub-blocks are not signaled and inferred to be 1.

In VVC 6's transform residual coding, because the position of the last significant coefficient is always signaled and the last significant coefficient is always a non-zero value, sig_coeff_flag of the last significant coefficient is not required to be signaled and is inferred to be 1. In contrast, in the disclosed methods, when cu_transquant_bypass_flag=1, the last significant coefficient is always the bottom-right coefficient and it can be either zero or a non-zero value. Therefore, if cu_transquant_bypass_flag=1, the disclosed methods can signal sig_coeff_flag of the position of the last significant coefficient. But, if cu_transquant_bypass_flag=0, the disclosed methods can signal sig_coeff_flag in the same way as VVC 6's transform residual coding.

Table 5 in FIG. 9 shows an exemplary transform residual coding syntax table for signaling the position of the last significant coefficient, according to the disclosed methods. In Table 5 (FIG. 9), the syntax elements shown in dashed line box are proposed changes to VVC 6's transform residual coding syntax.

According to some embodiments of the disclosure, the signaling of the position of the last significant coefficient can be omitted for transform residual coding regardless the value of cu_transquant_bypass_flag.

Figure 10:
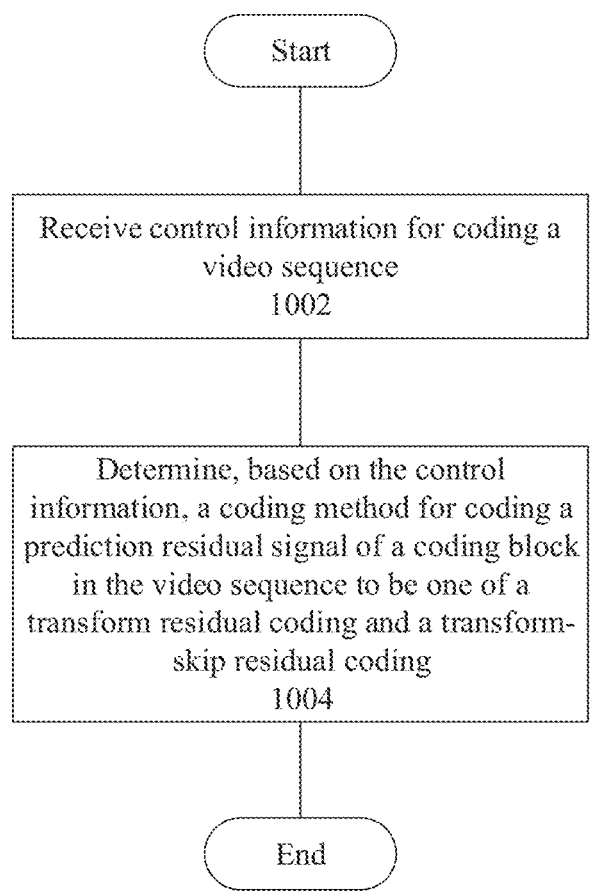
FIG. 10 is a flowchart of an exemplary computer-implemented method for processing video signals with residual coding, consistent with embodiments of the disclosure.

FIG. 10 is a flowchart of an exemplary computer-implemented method 1000 for processing video signals with residual coding, consistent with embodiments of the disclosure. In some embodiments, method 1000 can be performed by a codec (e.g., an encoder using encoding processes 200A or 200B in FIGS. 2A-2B or a decoder using decoding processes 300A or 300B in FIGS. 3A-3B). For example, the codec can be implemented as one or more software or hardware components of an apparatus (e.g., apparatus 400) for encoding or transcoding a video sequence. In some embodiments, the video sequence can be an uncompressed video sequence (e.g., video sequence 202) or a compressed video sequence that is decoded (e.g., video stream 304). In some embodiments, the video sequence can be a monitoring video sequence, which can be captured by a monitoring device (e.g., the video input device in FIG. 4) associated with a processor (e.g., processor 402) of the apparatus. The video sequence can include multiple pictures. The apparatus can perform method 1000 at the level of pictures. For example, the apparatus can process one picture at a time in method 1000. For another example, the apparatus can process a plurality of pictures at a time in method 1000. Method 1000 can include steps as below.

At step 1002, control information for coding a video sequence can be received. The control information can include a flag that can be signaled at different levels of the video sequence. For example, the flag can be signaled at a CU level, a slice level, a picture level, or in the picture parameter set (PPS) or SPS.

At step 1004, a coding method for coding a prediction residual signal of a coding block in the video sequence can be determined to be one of a transform residual coding and a transform-skip residual coding based on the control information.

In some embodiments, the control information can be signaled at a coding unit level of the video sequence and the control information comprises a first flag indicating whether to skip transform and quantization of a prediction residual signal of the coding block. For example, the first flag can be cu_transquant_bypass_flag. In response to the first flag satisfying a first condition, the coding method can be determined to be the transform residual coding. As show in Table 1 (FIG. 5), if a value of cu_transquant_bypass_flag is "1," the transform residual coding is used regardless of the value of intra_bdpcm_flag or transform_skip_flag. Thus, the first condition can include a value of the first flag being "1." It is appreciated that the transform residual coding is performed by a lossless codec. If a value of cu_transquant_bypass_flag is "0," the transform-skip and BDPCM blocks can both use TS residual coding.

In some embodiments, the control information can further include a second flag and a third flag. For example, the second flag can be intra_bdpcm_flag and the third flag can be transform_skip_flag. When the first flag does not satisfy a first condition, the coding method can be determined based on a value of the second flag or the third flag. If intra_bdpcm_flag is equal to "1," the coding method can be BDPCM. If transform_skip_flag is equal to "1," the coding method can be transform skip coding.

In some embodiment, other than being signaled at the coding unit level, the control information can be signaled in a sequence parameter set (SPS) of the video sequence and the control information can include a fourth flag and a fifth flag. For example, the fourth flag can be sps_bdpcm_transform_residual_coding_flag, and the fifth flag can be intra_bdpcm_flag. As discussed with reference to Table 2 (FIG. 6), in response to the fourth flag and the fifth flag being equal to a first value (e.g., "1"), the coding method can be determined to be the transform residual coding. And in response to the fourth flag being equal to a second value (e.g., "0") and the fifth flag being equal to the first value (e.g., "1"), the coding method can be determined to be the transform-skip residual coding.

In some embodiments, the fourth flag can be signaled in the control information, when the block differential pulse code modulation (BDPCM) is enabled for the video sequence. In some embodiments, the fourth flag can be signaled in the control information, when the BDPCM is enabled for the video sequence and a transform and quantization bypass mode is enabled for the coding block.

In some embodiments, the control information can be signaled at a slice level for a slice of the video sequence. And the control information can include a sixth flag (e.g., slice_ts_residual_coding_disabled_flag). As discussed with reference to Table 3 (FIG. 7) and Table 4 (FIG. 8), the coding method for coding a prediction residual signal of the coding block can be determined to be the transform-skip residual coding, when a value of the sixth flag is a first value. It is appreciated that the coding block is associated with the slice, for which the control information is signaled at the slice level.

In some embodiments, a non-transitory computer-readable storage medium including instructions is also provided, and the instructions may be executed by a device (such as the disclosed encoder and decoder), for performing the above-described methods. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same. The device may include one or more processors (CPUs), an input/output interface, a network interface, and/or a memory.

The embodiments may further be described using the following clauses:

1. A computer-implemented method, comprising:
   receiving control information for coding a video sequence; and
   determining, based on the control information, a coding method for coding a prediction residual signal of a coding block in the video sequence, the coding method being one of a transform residual coding and a transform-skip residual coding.

2. The method according to clause 1, wherein the control information is signaled at a coding unit level of the video sequence, wherein:
   the control information comprises a first flag indicating whether to skip transform and quantization of the prediction residual signal of the coding block.

3. The method according to clause 2, wherein determining, based on the control information, the coding method further comprises:
   in response to the first flag satisfying a first condition, determining the coding method to be the transform residual coding.

4. The method according to clause 3, wherein:
   the first condition comprises a value of the first flag being "1," and the transform residual coding is performed by a lossless codec.

5. The method according to clause 2, wherein:
   the control information further comprises a second flag and a third flag, and
   determining, based on the control information, the coding method further comprises:
      in response to the first flag not satisfying a first condition, determining the coding method based on a value of the second flag or the third flag.

6. The method according to clause 1, wherein the control information is signaled in a sequence parameter set of the video sequence, wherein:
   the control information comprises a fourth flag and a fifth flag, and
   determining, based on the control information, the coding method further comprises:
      in response to the fourth flag and the fifth flag having a same value, determining the coding method to be the transform residual coding; and
      in response to the fourth flag and the fifth flag having different values, determining the coding method to be the transform-skip residual coding.

7. The method according to clause 6, further comprising:
   in response to the block differential pulse code modulation (BDPCM) being enabled for the video sequence, signaling the fourth flag in the control information.

8. The method according to clause 6, further comprising:
   in response to the BDPCM being enabled for the video sequence and a transform and quantization bypass mode being enabled for the coding block, signaling the fourth flag in the control information.

9. The method according to clause 1, wherein the control information is signaled at a slice level for a slice of the video sequence, wherein:
   the control information comprises a sixth flag, and
   determining, based on the control information, the coding method further comprises:
      in response to a value of the sixth flag being a first value, determining the coding method to be the transform-skip residual coding.

10. The method according to clause 9, wherein the coding block is associated with the slice.

11. A system for processing video signals with residual coding, comprising:
    a memory for storing a set of instructions; and
    at least one processor configured to execute the set of instructions for causing the system to perform:
       receiving control information for coding a video sequence; and
       determining, based on the control information, a coding method for coding a prediction residual signal of a coding block in the video sequence, the coding method being one of a transform residual coding and a transform-skip residual coding.

12. The system according to clause 11, wherein the control information is signaled at a coding unit level of the video sequence, wherein:
    the control information comprises a first flag indicating whether to skip transform and quantization of the prediction residual signal of the coding block.

13. The system according to clause 12, wherein in determining, based on the control information, the coding method, the at least one processor is configured to execute the set of instructions for causing the system to further perform:

in response to the first flag satisfying a first condition, determining the coding method to be the transform residual coding.

14. The system according to clause 13, wherein:
the first condition comprises a value of the first flag being "1," and
the transform residual coding is performed by a lossless codec.

15. The system according to clause 12, wherein:
the control information further comprises a second flag and a third flag, and
in determining, based on the control information, the coding method, the at least one processor is configured to execute the set of instructions for causing the system to further perform:
in response to the first flag not satisfying a first condition, determining the coding method based on a value of the second flag or the third flag.

16. The system according to clause 11, wherein the control information is signaled in a sequence parameter set of the video sequence, wherein:
the control information comprises a fourth flag and a fifth flag, and
in determining, based on the control information, the coding method, the at least one processor is configured to execute the set of instructions for causing the system to further perform:
in response to the fourth flag and the fifth flag having a same value, determining the coding method to be the transform residual coding; and
in response to the fourth flag and the fifth flag having different values, determining the coding method to be the transform-skip residual coding.

17. The system according to clause 16, wherein the at least one processor is configured to execute the set of instructions for causing the system to further perform:
in response to the BDPCM being enabled for the video sequence, signaling the fourth flag in the control information.

18. The system according to clause 16, wherein the at least one processor is configured to execute the set of instructions for causing the system to further perform:
in response to the BDPCM being enabled for the video sequence and a transform and quantization bypass mode being enabled for the coding block, signaling the fourth flag in the control information.

19. The system according to clause 11, wherein the control information is signaled at a slice level for a slice of the video sequence, wherein:
the control information comprises a sixth flag, and
in determining, based on the control information, the coding method, the at least one processor is configured to execute the set of instructions for causing the system to further perform:
in response to a value of the sixth flag being a first value, determining the coding method to be the transform-skip residual coding.

20. A non-transitory computer readable medium storing instructions that are executable by at least one processor of a computer system, wherein the execution of the instructions causes the computer system to perform a method comprising:
receiving control information for coding a video sequence; and
determining, based on the control information, a coding method for coding a prediction residual signal of a coding block in the video sequence, the coding method being one of a transform residual coding and a transform-skip residual coding.

It should be noted that, the relational terms herein such as "first" and "second" are used only to differentiate an entity or operation from another entity or operation, and do not require or imply any actual relationship or sequence between these entities or operations. Moreover, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items.

It is appreciated that the above described embodiments can be implemented by hardware, or software (program codes), or a combination of hardware and software. If implemented by software, it may be stored in the above-described computer-readable media. The software, when executed by the processor can perform the disclosed methods. The computing units and other functional units described in this disclosure can be implemented by hardware, or software, or a combination of hardware and software. One of ordinary skill in the art will also understand that multiple ones of the above described modules/units may be combined as one module/unit, and each of the above described modules/units may be further divided into a plurality of sub-modules/sub-units.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

In the drawings and specification, there have been disclosed exemplary embodiments. However, many variations and modifications can be made to these embodiments. Accordingly, although specific terms are employed, they are used in a generic and descriptive sense only and not for purposes of limitation.

What is claimed is:

1. A computer-implemented method for processing video content, the method implemented in an encoder and comprising:
receiving control information for coding a video sequence, wherein the control information is signaled at a slice level for a slice of the video sequence and includes a flag; and
determining, based on the control information, a coding method for coding a prediction residual signal of a coding block in the video sequence, the coding method being one of a transform residual coding and a transform-skip residual coding, wherein in response to a value of the flag being a first value, determining the coding method to be the transform-skip residual coding.

2. The method of claim 1, wherein the coding block is associated with the slice.

3. A system for processing video content, the system implemented in a decoder and comprising:
   a memory for storing a set of instructions; and
   at least one processor configured to execute the set of instructions for causing the system to perform:
   receiving control information for decoding a bitstream into a video sequence, wherein the control information is signaled at a slice level for a slice of the bitstream and includes a flag; and
   determining, based on the control information, a coding method for coding a prediction residual signal of a coding block in the bitstream, the coding method being one of a transform residual coding and a transform-skip residual coding, wherein in response to a value of the flag being a first value, determining the coding method to be the transform-skip residual coding.

4. The system of claim 3, wherein the coding block is associated with the slice.

5. A non-transitory computer readable medium storing a bitstream of a video for processing according to operations comprising:
   receiving control information for decoding the bitstream into a video sequence, wherein the control information is signaled at a slice level for a slice of the bitstream and includes a flag; and
   determining, based on the control information, a coding method for coding a prediction residual signal of a coding block in the bitstream, the coding method being one of a transform residual coding and a transform-skip residual coding, wherein in response to a value of the flag being a first value, determining the coding method to be the transform-skip residual coding.

6. The non-transitory computer readable medium of claim 5, wherein the coding block is associated with the slice.

* * * * *